(12) United States Patent
Hayashi et al.

(10) Patent No.: US 7,053,231 B2
(45) Date of Patent: *May 30, 2006

(54) BUILDING MATERIAL

(75) Inventors: Naoki Hayashi, Iwaki (JP); Hiroki Katono, Iwaki (JP); Katsuichi Machida, Iwaki (JP)

(73) Assignee: Kureha Chemical Industry Company, Ltd., Tokyo (JP)

( * ) Notice: Subject to any disclaimer, the term of this patent is extended or adjusted under 35 U.S.C. 154(b) by 84 days.

This patent is subject to a terminal disclaimer.

(21) Appl. No.: 10/830,737

(22) Filed: Apr. 22, 2004

(65) Prior Publication Data

US 2004/0204600 A1  Oct. 14, 2004

Related U.S. Application Data

(63) Continuation-in-part of application No. PCT/JP02/10669, filed on Oct. 15, 2002.

(30) Foreign Application Priority Data

Oct. 25, 2001  (JP)  .......................... P2001-328431

(51) Int. Cl.
C07F 9/02 (2006.01)

(52) U.S. Cl. ........................................ 556/24; 252/582

(58) Field of Classification Search .................. 556/24; 252/582

See application file for complete search history.

(56) References Cited

FOREIGN PATENT DOCUMENTS

| | | |
|---|---|---|
| JP | 6-118228 | 4/1994 |
| JP | 10-221523 | 8/1998 |
| JP | 10-282335 | 10/1998 |
| JP | 2002-212540 | * 7/2002 |
| WO | WO 98/25168 | 6/1998 |

* cited by examiner

*Primary Examiner*—Porfirio Nazario-Gonzalez
(74) *Attorney, Agent, or Firm*—Beyer Weaver & Thomas, LLP

(57) ABSTRACT

A building material is formed from a specific composition containing a phosphoric ester compound represented by the following formulae (8)-c and (8)-d and copper ions, in a resin plate.

4 Claims, 8 Drawing Sheets

BUILDING MATERIAL

RELATED APPLICATIONS

This is a continuation-in-part application of application serial no. PCT/JP02/10669 filed on Oct. 15, 2002, now pending.

BACKGROUND OF THE INVENTION

1. Field of the Invention

This invention relates to a building material, and more specifically to a building material which has absorption properties with respect to light of a specific wavelength (specific wavelength light) unique to the copper ion, and which has absorption properties with respect to light of wavelength from the near-infrared region to the infrared region and the ultraviolet region.

2. Related Background of the Invention

One example of a prior art optical material using the specific wavelength light absorption properties of copper ions is the material comprising an optical filter disclosed in Japanese Patent Application Laid-Open No. 6-118228 submitted by the Applicant. This special optical material contains a phosphoric ester, and has excellent absorption properties with respect to wavelengths from the near-infrared region to the infrared region (hereafter, infrared light absorption properties).

SUMMARY OF THE INVENTION

The aforesaid optical materials having infrared light absorption properties have little absorption in the visible light region, and therefore have excellent optical properties with regard to visible light also. In recent years, it has become desirable for these optical materials to have even less light absorption in the visible region while having excellent infrared light absorption properties when used as building materials.

On the other hand, these optical materials function as heat absorption materials due to their infrared light absorption properties, and are used for various materials which require blocking of heat rays. Examples of such applications are window materials and roofing materials (materials used in residences, shops and other buildings or constructions, automobiles, trains, ships, aeroplanes and other conveyance devices, or their parking areas and traffic lanes) which allow the influx of natural light such as sunlight and other outside light; general materials which aim to exclude indoor and outdoor light, agricultural materials for greenhouses and the like, or roofing materials and wall materials for absorbing infrared light (building materials used in residences, shops and other buildings or constructions, automobiles, trains, ships, aeroplanes and other conveyance devices or their parking areas and traffic lanes).

It has recently been pointed out that bad effect is caused due to the unpleasant heat generated by sunlight reflected from the surfaces of buildings into the environment, i.e., reflected illumination, and that a heat island effect in urban areas is causing the rise of normal atmospheric temperatures. Hence, a material which has infrared light absorption properties was strongly desired.

There is also an adverse effect on human beings (skin) from outside light such as sunlight, and as it contains ultraviolet light which can lead to degeneration of paint, painted or rubber products and plastic products, properties of these building materials were also desired which could block not only from heat absorption, but also from ultraviolet light in the incident light wavelengths. However, in the case of building materials which require a lower light absorption in the visible range, it was necessary to maintain visible light low absorption properties at a high level, so an optical material which could fully satisfy these applications was required.

It is therefore an object of the present invention, which was conceived in view of the above problems, to provide a polyfunctional building material which, while having excellent infrared light absorption properties and ultraviolet light absorption properties, maintained visible light absorption properties at a sufficiently low level.

In order to resolve the above problems, as a result of intensive studies performed by the Inventors, it was discovered that a composition obtained by using copper ions together with a phosphoric ester compound having a specific molecular structure had very visible light low absorption properties.

Also, it was discovered that this composition not only was very effective in absorbing light containing wavelengths from the near-infrared region to the infrared region, but also showed a high absorption index for the ultraviolet region, which led to the perfection of this invention.

Specifically, the building material according to this invention contains a phosphoric ester compound represented by the following formula (1) and a copper ion.

(1)

In the formula, R is a substituted or unsubstituted aryl group, n is 1 or 2, and when n is 1, R may be identical or different.

When the optical absorption spectra was measured for this composition, the following was found compared to the prior art:

1) the wavelength (hereafter, referred to as $\lambda$max) showing the maximum absorption index in the near-infrared wavelength region is shifted to longer wavelengths, 2) the absorbance in the long wavelength region (e.g., wavelength 650 nm) of the visible light transmittance wavelength region relative to the absorbance at this $\lambda$max, decreases, 3) the absorbance in the ultraviolet region in the vicinity of 420 nm and lower wavelengths is particularly high while maintaining a satisfactory low absorption level in the visible light region.

The proportion of hydroxyl groups or oxygen atoms derived from these hydroxyl groups in the phosphoric ester compound relative to one mole of copper ion is preferably 2 moles or more, more preferably 3 moles or more and most preferably 6 moles or more.

In building materials containing this composition, $\lambda$max is considerably shifted to longer wavelengths compared to conventional materials having identical component elements, and visible light low absorption properties relative to near-infrared light absorption properties are further enhanced. A high absorption index in the ultraviolet region is maintained and light absorption in the visible region is maintained at a low level even if this proportion varies.

More preferably, in the phosphoric ester compound, R in the aforesaid formula (1) is a group represented by formula (2) or formula (3).

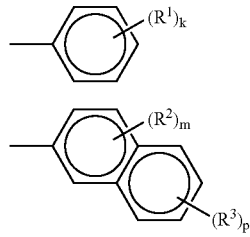

Herein, $R^1$, $R^2$ and $R^3$ in the aforesaid formula (2) and formula (3) are each independently a halogen atom, or a group (substituent group) having 1 to 40 carbon atoms. This substituent group may or may not contain unsaturated bonds. k may be an integer of 1 to 5, m may be an integer of 1 to 3, and p may be an integer of 1 to 4. When k, m or p is 2 or more, $R^1$, $R^2$ and $R^3$ may be mutually identical or different.

More preferably, $R^1$, $R^2$ and $R^3$ are each independently a halogen atom, a substituted or unsubstituted alkyl group having 1 to 10 carbon atoms, a group having 2 to 20 carbon atoms and containing at least one unsaturated bond, or a phenyl group (wherein at least one hydrogen atom may be substituted by a halogen atom, an alkyl group having 1 to 10 carbon atoms, or a group having 2 to 20 carbon atoms and containing at least one unsaturated bond, or wherein the phenyl group is unsubstituted).

More specifically, R in formula (1) may be represented by formula (2)-a.

The building material of this invention is a building material in one piece formed by the composition containing the aforesaid phosphoric ester compound. This building material is not limited to prefabricated materials for buildings, and may comprise materials which bring in outside light such as are used for example in car windows. Specific examples are canopies of passages such as arcades, curtains, canopies of car ports and garages, windows or wall materials of sun room, window materials of show windows or show case, tent or its window materials, blinds, roofing materials of fixed or temporary residences, skylights of fixed or temporary residences and other window materials of fixed or temporary residences, window materials of car, aeroplane or train (railway) carriage, coating materials of painted surfaces such as road signs, sunshades such as parasols, and agricultural building materials for plastic greenhouses (however, this list is not exhaustive).

It may also serve as a material which does not necessarily have to reduce light absorption properties in the visible region, for example in the case of curtains, window frame materials, blinds, roofing materials of fixed or temporary residences, wall materials of car, aeroplane or train (railway) carriage, paint materials for road signs and the like, sunshades such as parasols, and agricultural building materials for plastic greenhouses (however, this list is not exhaustive).

When the aforesaid composition is used in building materials, the composition may for example be applied as a resin film, mixed with an adhesive resin composition or mixed with a coating material. When the original building material is glass or plastic, a simple means may be used, i.e., it may be added to or mixed with the raw material during preparation, molding or working. It may also be mixed with various paints and used as a paint material.

DESCRIPTION OF THE PREFERRED EMBODIMENTS

Figure 1:
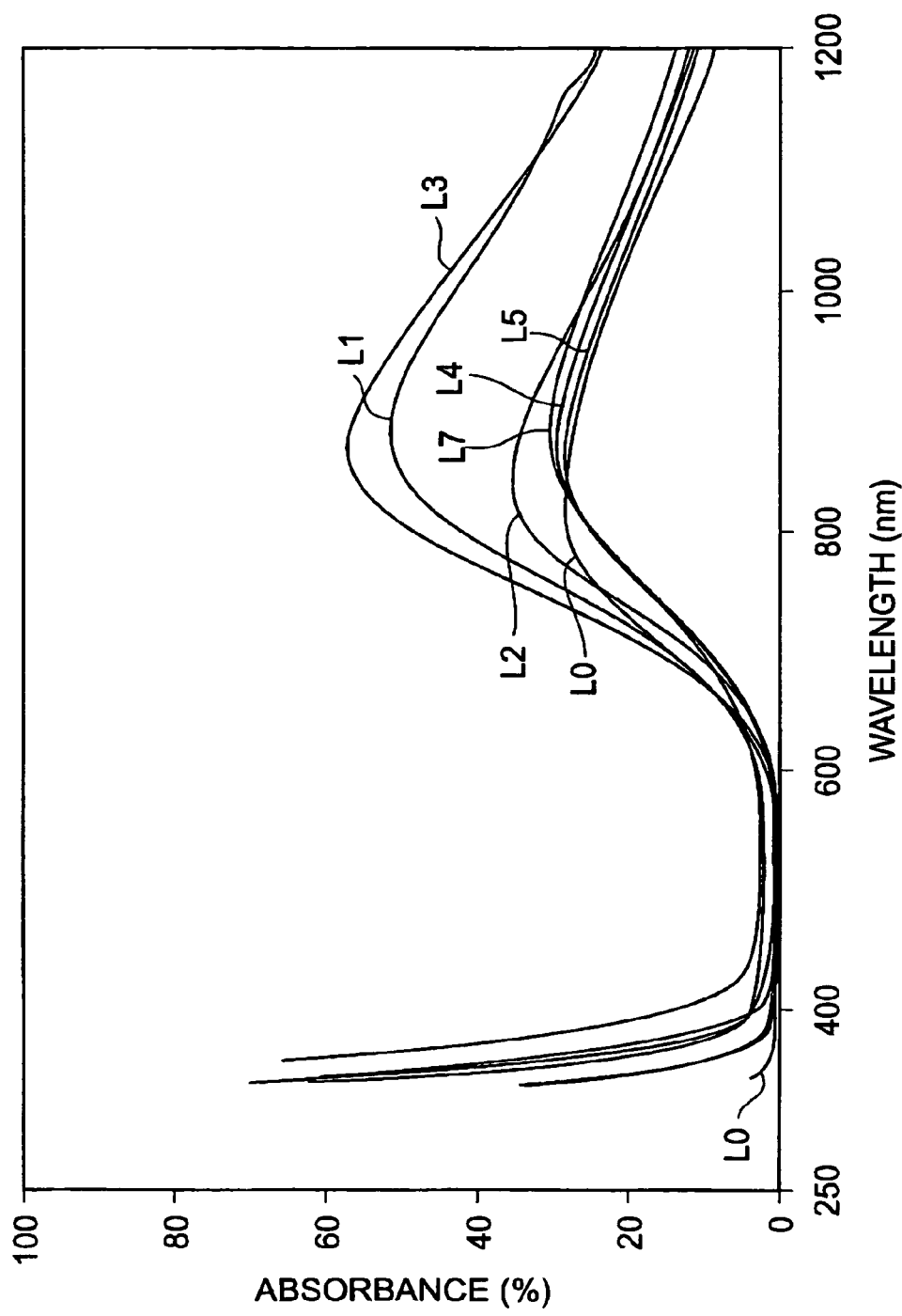
FIG. 1 is a graph showing optical absorption spectra of compositions in the Examples and Comparative Example when OH/Cu is 6.

The building material of this invention will now be described referring to specific embodiments.

(Copper Ion)

The composition contained in the building material of this invention, comprises copper ions and the phosphoric ester compound represented by formula (1). Examples of copper salts for supplying copper ions are anhydrous copper salts, or copper hydrates of organic acids such as copper acetate, copper acetate-hydrate, copper formate, copper stearate, copper benzoate, copper ethyl acetoacetate, copper pyrophosphate, copper naphthenate and copper citrate; anhydrous copper salts, or copper hydrates of inorganic acids such as copper chloride, copper sulphate, copper nitrate and basic copper carbonate; or copper hydroxide. Among these, copper acetate, copper acetate-hydrate, copper benzoate, copper hydroxide or basic copper carbonate are preferred.

Metal ions other than copper ions (hereafter, "other metal ions") which may also be contained in this composition are not particularly limited, for example ions of alkali metals, alkaline earth metals or transition metals, more specifically ions of sodium, potassium, calcium, iron, manganese, magnesium or nickel.

If another metal ion is contained in the composition, the blending proportion of the other metal ions with copper ion is such that, for example, the copper ion preferably accounts for 50 mass % or more, but more preferably 70 mass % or more, of all the metal ions. In this way, the building material of this invention can make effective use of the optical properties specific to copper ions.

(Phosphoric Ester Compound)

The phosphoric ester compound contained in the building material of this invention is represented by the following formula (1). In the formula, R is a substituted or unsubstituted aryl group, specifically a substituted or unsubstituted phenyl group, a substituted or unsubstituted naphthyl group, or a substituted or unsubstituted anthryl group. n is 1 or 2, and when n is 1, R may be identical or different.

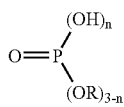
(1)

In the phosphoric ester compound represented by formula (1) (hereafter, "specific phosphoric ester compound"), it is more preferred that R in formula (1) is represented by the following formula (2) or formula (3):

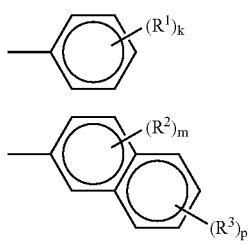
(2)

(3)

Herein, $R^1$, $R^2$ and $R^3$ in the aforesaid formula (2) and formula (3) each independently represent a halogen atom, or a group (substituent group) having 1 to 40 carbon atoms. This substituent group may or may not contain unsaturated bonds. k may be an integer of 1 to 5, m may be an integer of 1 to 3, and p may be an integer of 1 to 4. When k, m or p is 2 or more, $R^1$, $R^2$ and $R^3$ may be mutually identical or different.

$R^1$, $R^2$ and $R^3$ may conveniently be a halogen atom, a substituted or unsubstituted alkyl group having 1 to 10 carbon atoms, a group having 2 to 20 carbon atoms containing at least one unsaturated bond, or a substituted or unsubstituted phenyl group. More preferably, in the substituted phenyl group, at least one hydrogen atom is substituted by a halogen atom, an alkyl group having 1 to 10 carbon atoms, or a group having 2 to 20 carbon atoms containing at least one unsaturated bond (e.g., a (meth)acryloyl group, or a (meth)acryloyloxyalkyl group). Among these, a specific example of the group R having a (meth)acryloyloxyalkyl group is the group represented by the following formula (2)-a:

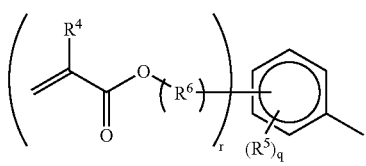
(2)-a

Herein, in formula (2)-a, $R^4$ is a hydrogen atom or a methyl group, $R^5$ is a hydrogen atom, alkyl group having 1 to 10 carbon atoms, halogen atom, alkoxy group or phenyl group, $R^6$ is a straight-chain, branched or cyclic alkylene group having 1 to 10 carbon atoms, q is an integer of 0 to 4, r is an integer of 1 to 5, and q+r is an integer of 1 to 5.

These phosphoric ester compounds may be manufactured for example by the following Method 1, Method 2 or Method 3.

[Method 1]

According to Method 1, the compound represented by the following formula (4) and phosphorus pentaoxide are reacted in the absence of a solvent or in a suitable organic solvent. R in the aforesaid formula (4) is the same group as R in the aforesaid formula (1).

HO—R (4)

The compound represented by formula (4) is a substituted or unsubstituted aromatic compound having a phenolic hydroxyl group, which herein is hereafter referred to as "specific aryl alcohol". Among these, a phenol wherein R is phenyl, or a group represented by the following formula (5) or formula (6), is preferred.

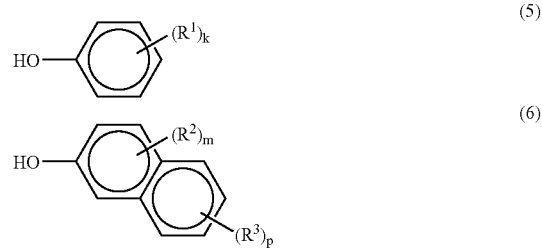
(5)

(6)

$R^1$, $R^2$ and $R^3$ in the formulae are respectively identical to the groups $R^1$, $R^2$ and $R^3$ in the aforesaid formulae (2) and (3). If the phosphoric ester compound represented by formulae (5) or (6) is used, the preferred phosphoric ester compound represented by the formulae (2) or (3) can be obtained.

Herein, among aryl alcohols represented by formula (5), specific examples where $R^1$ is a halogen atom are 2-fluorophenol, 4-fluorophenol, 3-chlorophenol and 4-chlorophenol.

Specific examples where $R^1$ is a group containing at least one unsaturated bond are 2-(meth)acryloylphenol, 3-(meth)acryloylphenol, 4-(meth)acryloylphenol, 2-arylphenol, 3-arylphenol and 4-arylphenol. Alternatively, a substituted phenol represented by the following formula (5)-a, e.g., 4-(meth)acryloyloxyethylphenol, may conveniently be used.

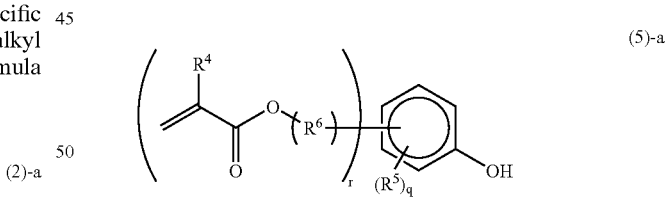
(5)-a

Examples where $R^1$ is a substituted or unsubstituted phenyl group are 2-phenylphenol, 3-phenylphenol or 4-phenylphenol. Specific examples represented by formula (6) are α-napthol or β-naphthol.

(meth) is used for the sake of convenience when it is desired to indicate both acrylic acid or its derivatives, and methacrylic acid or its derivative, and this method was also adopted in this specification (hereafter, idem).

The organic solvent used in the reaction between the specific aryl alcohol and phosphorus pentaoxide is an organic solvent which does not react with phosphorus pentaoxide, for example a hydrocarbon solvent such as hexane, cyclohexane, heptane, octane, benzene, toluene, xylene and petroleum spirits; a halogenated hydrocarbon solvent such as chloroform, carbon tetrachloride, dichloroethane and chlorobenzene; an ether solvent such as diethyl ether, diisopropyl ether, dibutyl ether and tetrahydrofuran; or a ketonic solvent such as acetone, methylethylketone and dibutyl ketone. Among these, toluene and xylene are preferred.

In Method 1, as for the conditions of reaction between the specific aryl alcohol and phosphorus pentaoxide, the reaction temperature is 0 to 100° C., more preferably 40 to 80° C., and the reaction time is 1 to 96 hours, more preferably 4 to 72 hours.

If for example the specific aryl alcohol and phosphorus pentaoxide are used in a proportion of 3:1 in terms of molar ratio, a mixture having a proportion of approximately 1:1 between a phosphoric ester compound wherein the number of hydroxyl groups in formula (1) is 2 (n is 2 in formula (1) (hereafter, "monoester"), and a phosphoric ester compound wherein the number of hydroxyl groups in formula (1) is 1 (n is 1 in formula (1) (hereafter, "diestet"), is obtained.

By suitably selecting the proportion of the specific aryl alcohol and phosphorus pentaoxide, and the reaction conditions, the proportion of monoester and diester can be adjusted within the range of 99:1 to 40:60 in terms of molar ratio.

[Method 2]

In Method 2, a specific aryl alcohol is reacted with a phosphorus oxyhalide in the absence of a solvent or in a suitable organic solvent, following which water is added to the obtained product to hydrolyze it. The phosphorus oxyhalide is preferably phosphorus oxychloride or phosphorus oxybromide, but phosphorus oxychloride is particularly preferred.

The organic solvent used for the reaction between the specific aryl alcohol and phosphorus oxyhalide is an organic solvent which does not react with phosphorus oxyhalides, for example a hydrocarbon solvent such as hexane, cyclohexane, heptane, octane, benzene, toluene, xylene and petroleum spirits; a halogenated hydrocarbon solvent such as chloroform, carbon tetrachloride, dichloroethane and chlorobenzene; or an ether solvent such as diethyl ether, diisopropyl ether and dibutyl ether. Among these, toluene and xylene are preferred.

As for the conditions of the reaction between the specific aryl alcohol and phosphorus oxyhalide, the reaction temperature is 0 to 110° C., more preferably 40 to 80° C., while the reaction time is 1 to 20 hours, more preferably 2 to 8 hours. In Method 2, the monoester may be obtained for example by using the proportion of 1:1 between the specific aryl alcohol and phosphorus oxyhalide in terms of molar ratio.

By suitably selecting the proportions of the specific aryl alcohol and phosphorus oxyhalide, and the reaction conditions, a mixture of the monoester and diester is obtained, and at this time, the proportion is adjusted to within the range of 99:1 to 1:99 terms of molar ratio.

[Method 3]

According to Method 3, a phosphoric ester compound is synthesized by a reaction between a specific aryl alcohol and a phosphorus trihalide in the absence of a solvent or in a suitable organic solvent, and the obtained phosphonic ester compound is then oxidized. The phosphorus trihalide may be phosphorus trichloride or phosphorus tribromide, but phosphorus trichloride is particularly preferred.

The organic solvent used for the reaction between the specific aryl alcohol and phosphorus trihalide is an organic solvent which does not react with phosphorus trihalides, for example a hydrocarbon solvent such as hexane, cyclohexane, heptane, octane, benzene, toluene, xylene and petroleum spirits; a halogenated hydrocarbon solvent such as chloroform, carbon tetrachloride, dichloroethane and chlorobenzene; or an ether solvent such as diethyl ether, diisopropyl ether and dibutyl ether. Among these, hexane and heptane are preferred. As for the conditions of the reaction between the specific aryl alcohol and phosphorus trihalide, the reaction temperature is 0 to 90° C., more preferably 40 to 75° C., while the reaction time is 1 to 10 hours, more preferably 2 to 5 hours.

The aforesaid phosphonic ester compound may be oxidized for example by reacting the phosphonic ester compound with a halogen such as chlorine gas to synthesize a phosphohaloridate compound, and then hydrolyzing this phosphohaloridate compound. Herein, the temperature of the reaction between the phosphonic ester compound and halogen is preferably 0 to 40° C., more preferably 5 to 25° C. Further, prior to oxidation of the phosphonic ester compound, this phosphonic ester compound may be purified by distillation.

In Method 3, a diester is obtained with high purity by for example mixing a specific aryl alcohol with a phosphorus trihalide in a molar ratio of 3:1. By suitably selecting the proportion of the specific aryl alcohol and phosphorus trihalide, and the reaction conditions, a mixture of the monoester and diester is obtained, and their proportion is adjusted within a range of 99:1 to 1:99 in terms of molar ratio.

Preferred examples of the phosphoric ester compound obtained by the aforesaid Method 1 to 3 are the compounds represented by the following formulae (7)-a, (7)-b, (8)-a to (8)-h, (9)-a to (9)-l and (10)-a to (10)-f. These phosphoric ester compounds may be used alone, or two or more may be used in combination, or alternatively, they may be used in admixture with a phosphoric ester compound not having an aromatic ring which can be used as the near-infrared light-absorbing composition of the prior art.

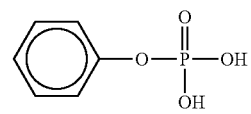

(7)-a

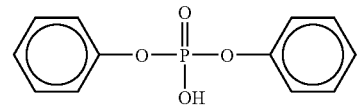

(7)-b

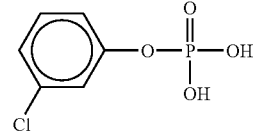

(8)-a

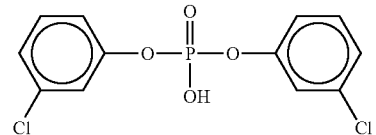

(8)-b (8)-c
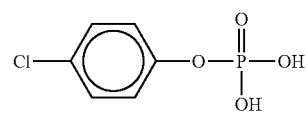
(8)-d
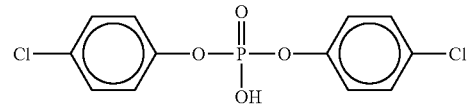
(8)-e
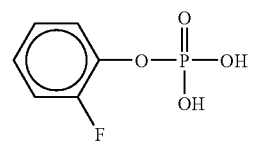
(8)-f
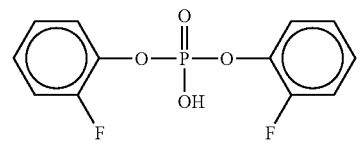
(8)-g
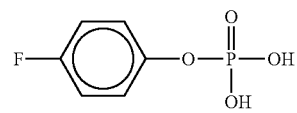
(8)-h
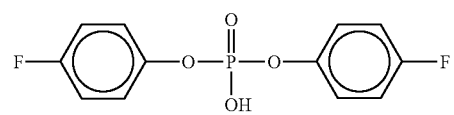
(9)-a
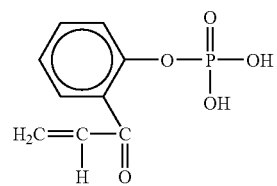
(9)-b
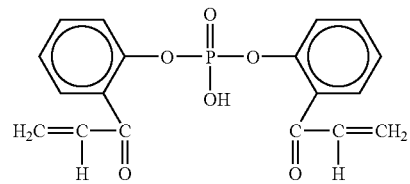
(9)-c
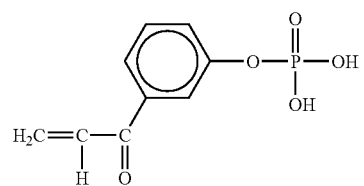
(9)-d
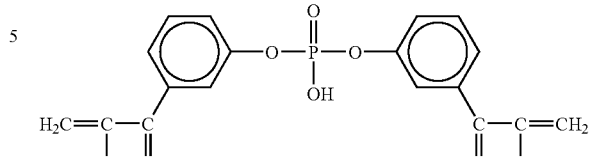
(9)-e
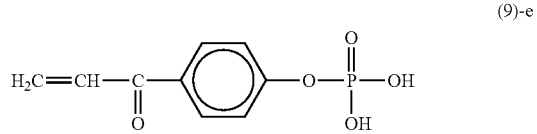
(9)-f
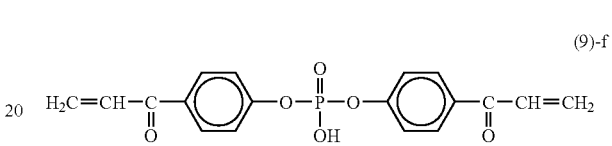
(9)-g
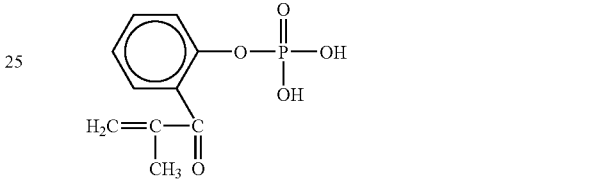
(9)-h
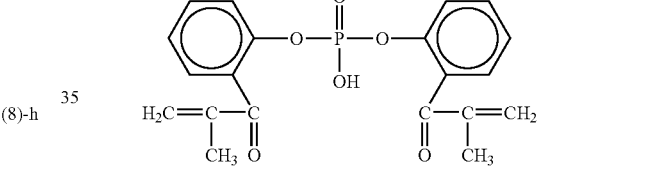
(9)-i
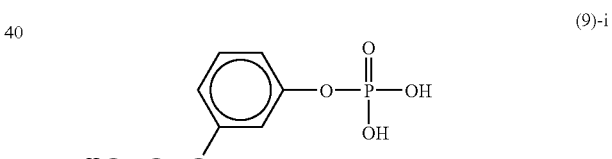
(9)-j
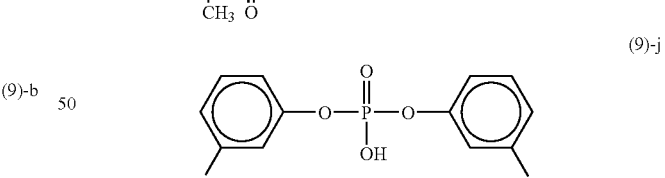
(9)-k
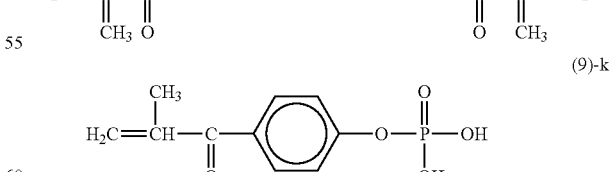
(9)-l
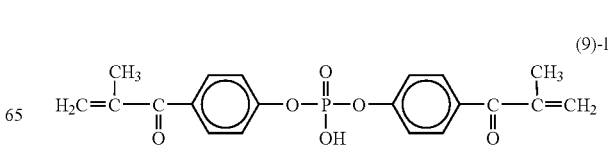

-continued

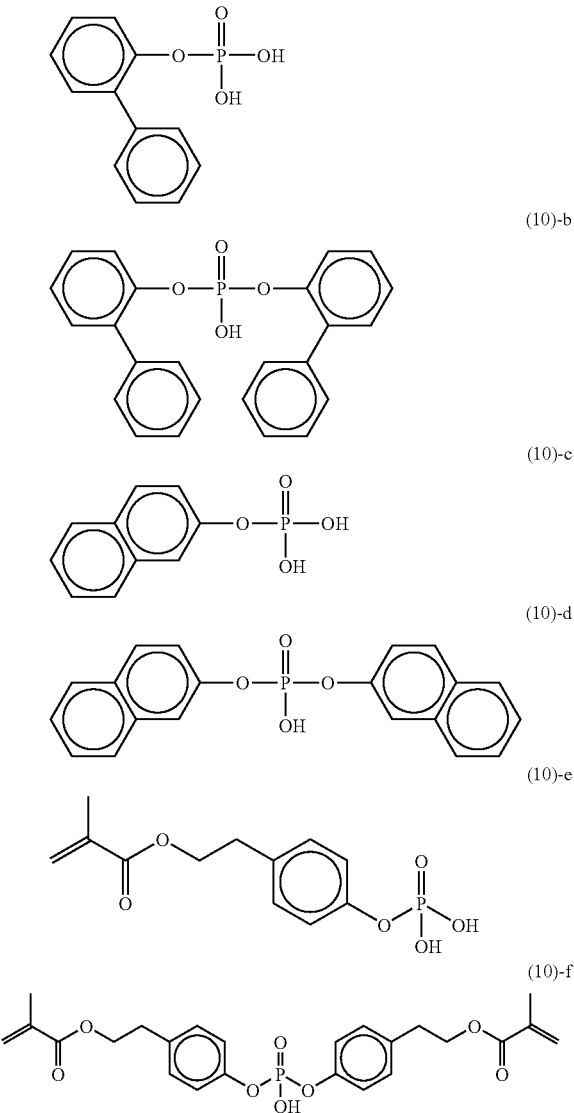

(10)-a
(10)-b
(10)-c
(10)-d
(10)-e
(10)-f

As mentioned above, the monoester or diester is used as the specific phosphoric ester compound, but in the case of the triester in which there is no hydroxyl group in formula (1), as there is no hydroxyl group capable of forming a coordinate bond and/or ionic bond with a metal ion such as copper ion, it is difficult to disperse metal ions such as copper ions in the resin when it is used as a resin composition.

As stated above, $R^1$, $R^2$ and $R^3$ in formulae (2) and (3) are preferably halogen atoms or substituent groups having 1 to 40 carbon atoms (which may or may not have unsaturated bonds). If the number of carbon atoms in this substituent group exceeds 40, when the phosphoric ester compound is contained in the resin described later, compatibility with the resin may significantly decrease, and consequently it becomes difficult to disperse metal ions such as copper ions in the resin.

When $R^1$, $R^2$ and $R^3$ in formulae (2) and (3) are substituted or unsubstituted alkyl groups, the number of carbon atoms is preferably 1 to 10. If a phosphoric ester compound wherein this number of carbon atoms exceeds 10 is contained in the resin described later, compatibility with the resin may decrease, and consequently it becomes difficult to disperse metal ions such as copper ions in the resin.

When $R^1$, $R^2$ and $R^3$ contain at least one unsaturated bond, the number of carbon atoms is preferably 2 to 20. If the number of carbon atoms in this situation exceeds 20, compatibility between the phosphoric ester compound and the resin may again decrease, and consequently it becomes difficult to disperse metal ions such as copper ions in the resin. Moreover, the same is effectively true also when $R^1$, $R^2$ and $R^3$ are substituted phenyl groups and the substituent group is a group containing an alkyl group or at least one unsaturated double bond.

In the building material of this invention, the content of hydroxyl groups (hydroxyl groups in formula (1)) or oxygen atoms derived from these hydroxyl groups in the phosphoric ester compound to one mole of copper ion, is preferably 2 moles or more, more preferably 3 moles or more, and still more preferably 6 moles or more. Further, when the phosphoric ester compound is such that $R^1$ in formula (2) is a halogen atom, this ratio is more preferably 2 to 9 and still more preferably 2 to 6.

According to the building material of the present invention, the phosphoric group of the phosphoric ester compound represented by formula (1) bonds with copper ion by coordinate bond and/or ionic bond, and this copper ion is mixed in the composition such that it is surrounded by the phosphoric ester. Due to this, light of wavelengths from the near-infrared region to the infrared region is selectively absorbed due to an electron transition between the d orbitals of the copper ion. Ultraviolet light is also selectively absorbed simultaneously, so not only excellent infrared light absorption properties but also excellent ultraviolet light absorption properties are obtained.

By using the phosphoric ester compound represented by formula (1), the wavelength showing the maximum absorption index in the near-infrared wavelength region (λmax) can be shifted towards longer wavelengths in comparison with the prior art. As a result, the absorbed light wavelength region shifts to longer wavelengths overall, and consequently the visible light transmittance wavelength region expands to longer wavelengths. In other words, the "visible window" is broadened. Therefore, visible light low absorption properties are obtained over a broader wavelength region than in the prior art.

Further, by using the specific phosphoric ester compound represented by formula (1), the long wavelength part of the visible light transmittance wavelength region, e.g., the absorbance in the vicinity of a wavelength of 650 nm, can be reduced relative to the absorbance at λmax. Therefore, visible light low absorption properties in the long wavelength part can be further enhanced relative to near-infrared light absorption properties.

Although the mechanism of this effect is still not well understood, the following may however be postulated as one reason. Specifically, the phosphoric ester compound represented by formula (1) has a larger molecular bulk than the phosphoric ester compound not having an aromatic ring of the prior art. Hence, intramolecular or intermolecular steric hindrance increases, and the bond distance to copper ion lengthens. As a result, the effect of another atom or ion on the valence electron state of copper ion (mutual interaction) decreases, the electron energy level structure of the copper ion differs from that of the prior art, and therefore optical properties are improved. However, the mechanism of action is not necessarily limited to this mechanism.

As the phosphoric ester compound, if R in formula (1) is the group represented by formula (3), the absorbance in the long wavelength part of the visible light transmittance wavelength region can be reduced. Due to these effects, the visible light low absorption properties of the composition and therefore of building materials containing it, are enhanced.

In the building material of this invention, if the content of hydroxyl groups or oxygen atoms derived from these hydroxyl groups in the phosphoric ester compound to one mole of copper ion is 2 moles or more, preferably 3 moles or more, and more preferably 6 moles or more, the aforesaid shift of λmax to longer wavelengths is particularly remarkable while maintaining high absorption properties in the ultraviolet light region. Therefore, visible light low absorption properties are still further enhanced.

In particular, when the phosphoric ester compound is such that $R^1$ shown by formula (2) is a halogen atom, by arranging this ratio to be more preferably 2 to 9 and still more preferably 2 to 6, absorbance in the short wavelength part of the visible light transmittance wavelength region can be further reduced.

If, as the phosphoric ester compound, R in formula (1) is the group represented by formula (3), preferably a substituted or unsubstituted naphthyl group, absorbance in the long wavelength part of the visible light transmittance wavelength region can be very remarkably reduced.

Moreover, if a phosphoric ester compound having a group R wherein $R^1$, $R^2$ and $R^3$ in formula (2) or (3) contain at least one unsaturated bond is used, the composition can be contained in a resin capable of copolymerization with this phosphoric ester compound, and polymerized. At this time, the phosphoric ester compound can be chemically dispersed in the resin. Therefore, the dispersibility when the phosphoric ester compound does not dissolve or disperse satisfactorily in the resin, and consequently the dispersibility of the copper ion, can be improved.

The building material of this invention will now be described from the viewpoint of different embodiments of the material.

[Embodiment 1]

A composition of the aforesaid specific phosphoric ester compound and copper ion (hereafter, specific composition) which is itself incorporated in a building material.

[Embodiment 2]

A liquid composition containing the specific composition which is supported by a member such as a plate or a frame.

[Embodiment 3]

A resin composition containing the specific composition.

[Embodiment 4]

An adhesive composition containing the specific composition which is incorporated in a building material. These aspects will now be described in further detail.

<Embodiment 1>

The specific composition used in this embodiment is manufactured by bringing the specific phosphoric ester composition and the aforesaid copper salt which is a source of copper ions into contact under suitable conditions, and reacting them. Specifically, the following Method 4 and Method 5 may be used. A metal salt which is a source of other metal ions may also be used in admixture. Hereafter, the metal salt containing a copper salt will be referred to simply as "metal salt".

[Method 4]

A method for mixing the specific phosphoric ester compound with the metal salt, and reacting them together.

[Method 5]

A method for reacting the specific phosphoric ester compound with the metal salt in a suitable organic solvent.

The organic solvent used in Method 5 is not particularly limited provided that it can dissolve or disperse the specific phosphoric ester compound used, for example, an aromatic compound such as benzene, toluene and xylene; an alcohol such as methyl alcohol, ethyl alcohol and isopropyl alcohol; a glycol ether such as methyl cellosolve ether and ethyl cellosolve; an ether such as diethyl ether, diisopropyl ether and dibutyl ether; a ketone such as acetone and methyl ethyl ketone; an ester such as ethyl acetate; hexane, kerosene and light petroleum. An organic solvent having polymerizing properties, e.g., a (meth)acrylic ester such as a (meth) acrylate, and aromatic vinyl compounds such as styrene and alpha-methylstyrene, may also be used.

<Embodiment 2>

The liquid composition used in this embodiment is formed by containing the specific composition in a solvent.

The solvent may be water or an organic solvent. Examples of an organic solvent are alcohols such as methyl alcohol, ethyl alcohol, isopropyl alcohol and butyl alcohol; glycol ethers such as methyl cellosolve and ethyl cellusolve; ethers such as diethyl ether and diisopropyl ether; ketones such as acetone, methylethyl ketone, methylisobutyl ketone and cyclohexanone; esters such as ethyl acetate, isopropyl acetate, butyl acetate and butyl cellusolve acetate; aromatic compounds such as benzene, toluene and xylene; hexane, kerosene and light petroleum. Examples of other solvents include (meth)acrylic esters such as (meth)acrylates, and aromatic vinyl compounds such as styrene and alpha-methyl styrene.

When this liquid composition employs an organic solvent as a solvent, it is preferably manufactured by [Method 4] or [Method 5] mentioned above.

It may be prepared also by dissolving or dispersing the specific composition manufactured beforehand in a solvent. The ratio of the specific composition contained in this liquid composition varies with the type of solvent, the uses of the optical material, and the purpose of use. From the viewpoint of viscosity after preparation, it is usually adjusted to 0.1 to 1900 weight parts, preferably 1 to 900 weight parts and more preferably 5 to 400 weight parts with respect to 100 weight parts of solvent.

<Embodiment 3>

The resin composition used in this embodiment is formed by dispersing the specific composition in a resin. The resin is not particularly limited provided that it is a resin having excellent compatibility or dispersibility with specific phosphoric ester compounds and/or phosphoric ester metal compounds, e.g., the acrylic resins shown below can be used.

Examples of acrylic resins are (meth)acrylic ester monomers or polymers made from them. Among (meth)acrylic ester monomers, examples of those having a single functional group are alkyl (meth)acrylates such as methyl (meth) acrylate, ethyl (meth)acrylate, n-propyl (meth)acrylate, n-butyl (meth)acrylate, isobutyl (meth)acrylate, t-butyl (meth)acrylate, n-hexyl (meth)acrylate, n-octyl (meth)acrylate; modified (meth)acrylates such glycidyl (meth)acrylate, 2-hydroxyethyl (meth)acrylate, 2-hydroxypropyl (meth) acrylate, hydroxybutyl (meth)acrylate, isobornyl (meth) acrylate, methoxy polyethylene (meth)acrylate and phenoxy (meth)acrylate; and polyfunctional (meth)acrylates such as ethylene glycol di(meth)acrylate, diethylene glycol di(meth)acrylate, polyethylene glycol di(meth)acrylate, polypropylene glycol di(meth)acrylate, 1,3-butylene glycol di(meth)acrylate, 1,4-butanediol di(meth)acrylate, 1,6-hexanediol di(meth)acrylate, neopentyl glycol di(meth)acrylate, 2-hydroxy-1,3-di(meth)acrylate, 2,2-bis[4-(meth)acryloxyethoxyphenyl]propane, 2-hydroxy-1-(meth)acryloxy-3-(meth)acryloxypropane, trimethylolpropanetri(meth)acrylate, pentaerythritol tri(meth)acrylate and pentaerythritol tetra(meth)acrylate.

Other resins which can be used are (meth)acrylic ester monomers, and other copolymerizing monomers which can undergo copolymerization with (meth)acrylic ester monomers.

Examples of such copolymerizing monomers are unsaturated carboxylic acids such as (meth)acrylic acid, 2-(meth)acryloyloxy-ethyl succinic acid and 2-(meth)acryloyloxy-ethyl phthalic acid; acrylamides such as N,N-dimethyl acrylamide; and aromatic vinyl compounds such as styrene, alpha-methyl styrene, chlorostyrene, dibromostyrene, methoxy styrene, vinyl benzoic acid and hydroxymethylstyrene.

Other resin polymers having a high compatibility with specific phosphoric ester compounds are polyethylene terephthalate (PET), polyethylene, polypropylene, polyvinyl chloride and polycarbonates; and polymers of aromatic vinyl compounds such as styrene, alpha-methyl styrene, chlorostyrene, dibromostyrene, methoxystyrene, vinylbenzoic acid, hydroxymethylstyrene and divinylbenzene.

Herein, when using only a monofunctional compound as the monomer which forms the resin, a thermoplastic substance is obtained as a polymerized compact, and when a polyfunctional compound is used as part or all of the monomer, a thermosetting compact is obtained. Therefore, by suitably selecting these resins, a compact product suited to the intended purpose, application and manufacturing/forming method can be obtained. Among these, if a thermoplastic substance is used, remolding after polymerization is easy, shaping workability improves and the degree of freedom when used as a building material is enhanced.

The method used to prepare this resin composition is not particularly limited, but Method 6 and Method 7 shown below may be used.

[Method 6]

Method 6 is a method of preparing a monomer composition containing a specific phosphoric ester compound and a metal salt, or a specific composition obtained by reacting them, in a monomer. This monomer composition can be used as an optical material as it is without polymerization. Alternatively, this monomer composition may be further made to undergo radical polymerization to give a polymer composition.

Herein, as described above, if the specific phosphoric ester compound is a phosphoric ester compound having a group R wherein $R^1$, $R^2$ and $R^3$ in formula (2) or (3) contain at least one unsaturated bond, the phosphoric ester compound and metal ions such as copper ions can be well dispersed in the resin by copolymerization of this phosphoric ester compound and the monomer.

The actual method of performing radical polymerization treatment of the monomer composition is not particularly limited, and methods known in the art, such as radical polymerization using the usual radical polymerization initiators, for example bulk (cast) polymerization, suspension polymerization, emulsion polymerization and solution polymerization, can be used.

As described above, the building material of this invention itself has excellent ultraviolet light absorption properties, but from the viewpoint of further improving the weatherability and heat-resisting properties of the building material compact obtained by polymerization of the monomer composition of this embodiment, various additives generally used for polymers such as ultraviolet absorbents and optical stabilizers, may be added to this monomer composition. In order to adjust the color tone of the building material, various colorants can also be added.

Examples of an ultraviolet absorbent are salicylates such as p-tert-butylphenylsalicylate, benzophenones such as 2,4-dihydroxy benzophenone and 2-hydroxy-4-methoxybenzophenone, benzotriazoles such as 2-(2'-hydroxy-3'-tert-butyl-5'-methylphenyl)-5-chlorobenzotriazole and 2-(2'-hydroxy-5'-octylphenyl) benzotriazole, and cyanoacrylates such as ethyl-2-cyano-3,3-diphenylacrylate.

Examples of an optical stabilizer are hindered amines, such as bis(1,2,2,6,6 pentamethyl-4-piperidyl)sebacate, bis (2,2,6,6-tetra-methyl-4-piperidyl)sebacate, di(1,2,2,6,6-pentamethyl-4-piperidyl)-butyl(3',5'-di-tert-butyl-4-hydroxybenzyl)malonate, 1-(2-(3-(3,5-di-tert-butyl-4-hydroxyphenyl)propionyloxy)ethyl)-4-(3-(3,5-di-tert-butyl-4-hydroxyphenyl)propionyloxy)-2,2,6,6-tetramethylpiperidine, poly{(6-{1,1,3,3-tetramethylbutyl) amino}-1,3,5-triazine-2,4-di-il(1,6-{2,2,6,6-tetramethyl-4-piperidinyl}aminohexamethylene)}, poly{{6-(morpholino)-S-triazine- 2,4-di-il}{1,6-(2,2,6,6-tetramethyl-4-piperidyl) amino}hexamethylene} and a dimethylsuccinate polymer with 4-hydroxy-2,2,6,6-tetramethyl-1-piperidinetanol.

The radical polymerization initiator may be a usual organic peroxide polymerization initiator, for example a peroxyester such as tert-butylperoxy-neodecanoate, tert-butylperoxydecanate, tert-butylperoxypivalate, tert-butylperoxybenzoate, tert-butylperoxy-2-ethylhexanoate, tert-butylperoxylaurate and tert-butylperoxy-3,5,5-trimethylhexanoate; a diacylperoxide such as lauroyl peroxide and 3,5,5-trimethylhexanoylperoxide; and a peroxyketal such as 1,1-bis(tert-butylperoxy)-3,5,5-trimethylcyclohexane.

Alternatively, it may be an azo radical polymerization initiator, such as 2,2-azobis(isobutyronitrile), or 2,2'-azobis (2,4-dimethylvaleronitrile) and 1,1'-azobis (cyclohexane-2-carbonitrile).

[Method 7]

In Method 7, a specific phosphoric ester compound and a metal salt, or a specific composition obtained by reacting them, is added to and mixed with a resin. This method can be used when a thermoplastic resin is used as the resin. Specifically, (1) the specific phosphoric ester compound and metal salt, or the specific composition, is added and kneaded to the melted resin, or (2) the resin is dissolved, dispersed or swollen in a suitable organic solvent, the phosphoric ester compound and metal salt, or the specific composition, is added to and mixed with this solution, and the organic solvent is then removed from the solution.

The kneading means in the aforesaid method (1) is a means generally used in melt kneading of thermoplastic resins, e.g. melt kneading with a mixing roller, or premixing with a Henschel mixer or the like followed by melt kneading with an extruder.

The organic solvent used in the aforesaid method (2) is not particularly limited provided that the resin can be dissolved, dispersed or swollen in it. Specific examples are alcohols such as methyl alcohol, ethyl alcohol and isopropyl alcohol; ketones such as acetone and methyl ethyl ketone;

aromatic hydrocarbons such as benzene, toluene and xylene; chlorinated hydrocarbons such as methylene chloride; and amide compounds such as dimethylacrylamide and dimethylformamide.

Herein, the ratio of the specific composition in the resin composition varies with the application or purpose of the building material, but from the viewpoint of moldability, it is usually adjusted to 0.1 to 400 weight parts, preferably 0.3 to 200 weight parts and still more preferably 1 to 100 weight parts with respect to 100 weight parts of resin. The ratio of metal ions in the resin composition is preferably adjusted to 2 to 60 mass % with respect to the whole resin composition.

<Embodiment 4>

The adhesive composition used in this embodiment is one aspect of the resin composition wherein the specific composition obtained by the reaction of a specific phosphoric ester compound and a metal salt is contained in a resin having adhesive properties (hereafter, "adhesive resin"). The building material of this embodiment can easily be obtained by incorporating this adhesive composition in a prefabricated building material to form one piece. Examples of this adhesive resin are adhesive acrylic resins, adhesive polyvinyl butyral, adhesive ethylene-vinylacetate copolymer and its partially saponified products.

This adhesive composition may be made to further contain a benzotriazole ultraviolet absorbent, benzophenone ultraviolet absorbent, salicylic acid ultraviolet absorbent, other anti-oxidants or stabilizers. It may also contain various plasticizers. Examples of such plasticizers are phosphoric ester plasticizers such as tricresyl phosphate and triphenyl phosphate; phthalate plasticizers such as dioctyl phthalate and dibutyl phthalate; fatty acid plasticizers such as dibutyl sebacate, butyl ricinolate, methyl acetyl ricinolate and butyl succinate; and glycol plasticizers such as butyl phthalyl butyl glycolate, triethylene glycol dibutyrate, triethylene glycol di-2-ethyl butyrate and polyethylene glycol.

The building material of this invention in these embodiments can be used in various states and shapes, such as powder, liquid, adhesive, paint, film, coating, plate, cylinders and lens shapes.

EXAMPLES

Specific examples concerning the present invention will now be explained, which do not restrict the present invention.

Example 1

0.08 g of copper acetate monohydrate and a predetermined amount of a phosphoric ester compound (hereafter, "DIPHP") represented by formula (7)-b, were stirred in methyl ethyl ketone (hereafter, "MEK") for 2 hours, and a liquid specific composition was thus obtained. As the predetermined amount of DIPHP, the molar ratio (hereafter, expressed as "OH/Cu") of the hydroxyl group in the phosphoric ester compound to copper ion was varied in the range of 1 to 15. As an example, the addition amount of DIPHP when OH/Cu is 4, was 0.4067 g.

Example 2

0.04 g of copper acetate monohydrate and a predetermined amount of a mixture (hereafter, "3ClPHP") of a phosphoric ester compound represented by formula (8)-a and a phosphoric ester compound represented by formula (8)-b, were stirred in MEK for 2 hours, and a liquid specific composition was thus obtained. As the predetermined amount of 3ClPHP, OH/Cu was varied in the range of 1 to 15. As an example, the addition amount of 3ClPHP when OH/Cu is 4, was 0.2553 g.

Example 3

0.04 g of copper acetate monohydrate and a predetermined amount of a mixture (hereafter, "4ClPHP") of a phosphoric ester compound represented by formula (8)-c and a phosphoric ester compound represented by formula (8)-d, were stirred in MEK for 2 hours, and a liquid specific composition was thus obtained. As the predetermined amount of 4ClPHP, OH/Cu was varied in the range of 1 to 10. As an example, the addition amount of 4ClPHP when OH/Cu is 4, was 0.2553 g.

Example 4

0.08 g of copper acetate monohydrate and a predetermined amount of a mixture (hereafter, "2FPHP") of a phosphoric ester compound represented by formula (8)-e and a phosphoric ester compound represented by formula (8)-f, were stirred in MEK for 2 hours, and a liquid specific composition was thus obtained. As the predetermined amount of 2FPHP, OH/Cu was varied in the range of 1 to 10. As an example, the addition amount of 2FPHP when OH/Cu is 4, was 0.4067 g.

Example 5

0.04 g of copper acetate monohydrate and a predetermined amount of a mixture (hereafter, "4FPHP") of a phosphoric ester compound represented by formula (8)-g and a phosphoric ester compound represented by formula (8)-h, were stirred in MEK for 2 hours, and a liquid specific composition was thus obtained. As the predetermined amount of 4FPHP, OH/Cu was varied in the range of 1 to 15. As an example, the addition amount of 4FPHP when OH/Cu is 4, was 0.2033 g.

Example 6

0.04 g of copper acetate monohydrate and a predetermined amount of a mixture (hereafter, "NAPHP") of a phosphoric ester compound represented by formula (10)-c and a phosphoric ester compound represented by formula (10)-d, were stirred in MEK for 2 hours, and a liquid specific composition was thus obtained. As the predetermined amount of NAPHP, OH/Cu was varied in the range of 1.5 to 2.5. As an example, the addition amount of NAPHP when OH/Cu is 2.5, was 0.1752 g.

Example 7

0.04 g of copper acetate monohydrate and a predetermined amount of a mixture (hereafter, "2PHPHP") of a phosphoric ester compound represented by formula (10)-a and a phosphoric ester compound represented by formula (10)-b, were stirred in MEK for 2 hours, and a liquid specific composition was thus obtained. As the predetermined amount of 2PHPHP, OH/Cu was varied in the range of 1 to 15. As an example, the addition amount of 2PHPHP when OH/Cu is 4, was 0.3219 g.

Comparative Example 1

0.08 g of copper acetate monohydrate and a predetermined amount of a mixture (hereafter, "PMOE") of a phosphoric ester compound represented by formula (11)-a and a phosphoric ester compound represented by formula (11)-b, were stirred in MEK for 2 hours, and a liquid near-infrared absorption composition was thus obtained. As the predetermined amount of PMOE, OH/Cu was varied in the range of 1 to 15. As an example, the addition amount of PMOE when OH/Cu is 4, was 0.2903 g.

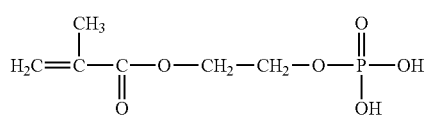
(11)-a

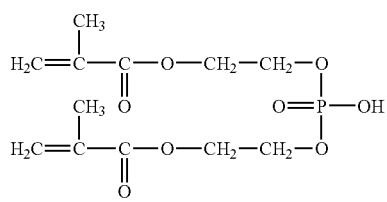
(11)-b

<Spectral Transmittance Measurement 1>

Spectral absorbance measurements were performed on the specific compositions prepared in Examples 1 to 7 and the near-infrared light absorption composition prepared in Comparative Example 1 using a "U-4000" spectrophotometer (manufactured by Hitachi, Ltd.). As an example of the measurement result, the optical absorption spectra of the specific composition of the Examples and of the near-infrared light absorption composition of the Comparative Example when OH/Cu is 6, are shown in FIG. 1. In the figure, the curve L0, curves L1 to L5 and curve L7, are respectively the spectral absorption curves of the compositions of Comparative Example 1, Examples 1 to 5 and Example 7 (Example 6 is not shown, as there are no data for OH/Cu=6).

From the figure, it was verified that the Examples and Comparative Example have a low absorption region (visible light transmittance wavelength region) from a wavelength of approx. 400 to approx. 650 nm, and infrared light absorption properties. It is also seen that the peak wavelength $\lambda$max of this absorbance is in the wavelength region of approx. 800 to 900 nm. It was confirmed that $\lambda$max in the specific compositions of the Examples was at a longer wavelength than that in the Comparative Example, while the absorbance in the near-infrared region of the Examples was higher than that of the Comparative Example, and infrared light absorption properties were improved.

Figure 2:
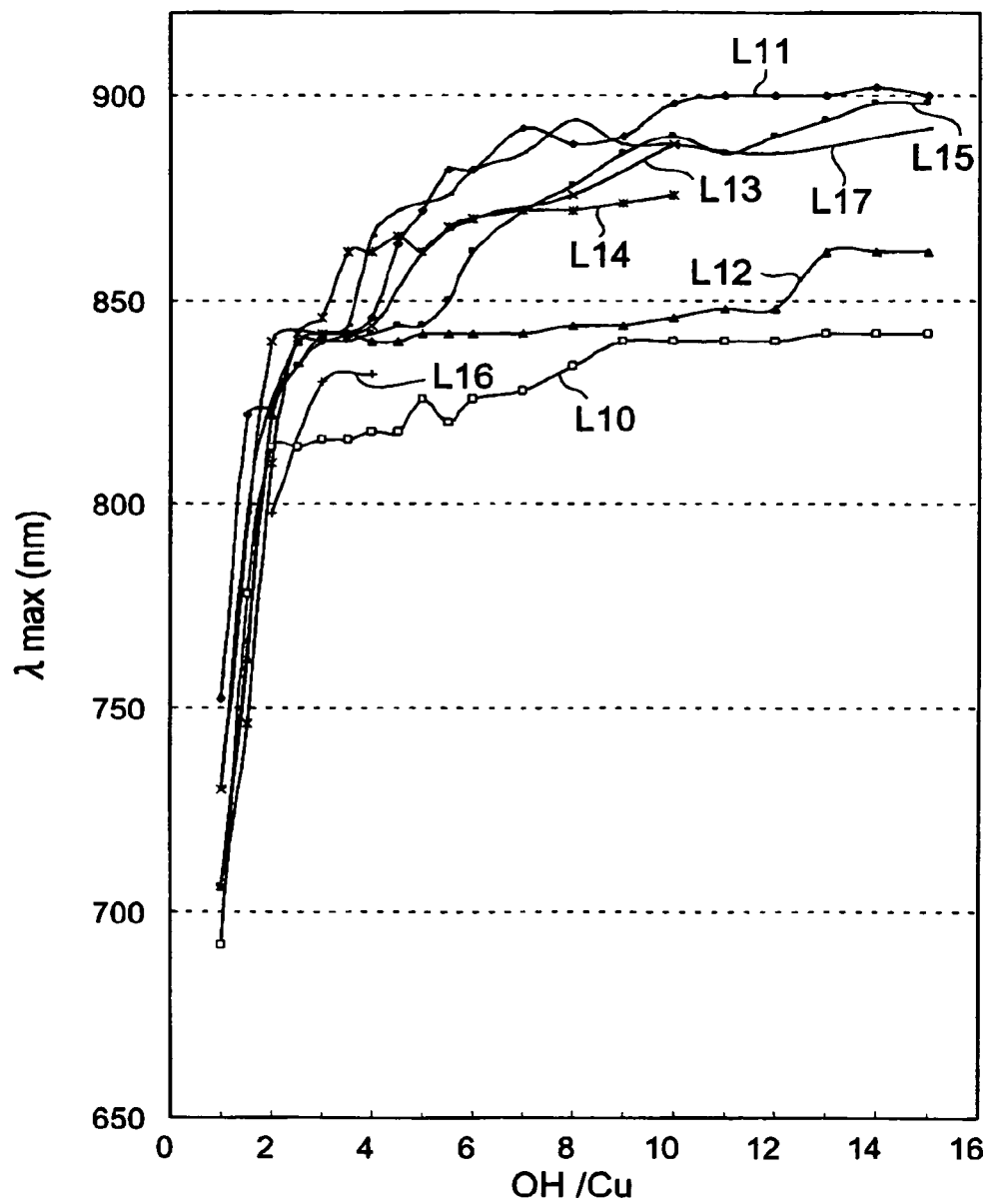
FIG. 2 is a graph showing a variation of λmax in the Examples and Comparative Example with respect to OH/Cu.

Data was also evaluated by focusing on the variation of $\lambda$max with respect to OH/Cu. FIG. 2 is a graph showing the variation of $\lambda$max (nm) of the Examples and Comparative Example with respect to OH/Cu. Numerical data is shown in Table 1. In the figure, $\lambda$max at the data sampling point of each OH/Cu is plotted with a different symbol for each example. The curves L10 and L11 to 17 which connect identical symbols, are respectively guide lines for the data of the Comparative Example 1 and Examples 1 to 7, and are smoothed (below, smoothed guide lines are also shown in FIGS. 3 to 6).

TABLE 1

| | $\lambda$max (nm) | | | | | | | |
|---|---|---|---|---|---|---|---|---|
| OH/Cu | Comp. Ex. 1 PMOE | Ex. 1 DlPHP | Ex. 2 3ClPHP | Ex. 3 4ClPHP | Ex. 4 2FPHP | Ex. 5 4FPHP | Ex. 6 NAPHP | Ex. 7 2PHPHP |
| 1.0 | 692 | 752 | 706 | 730 | 706 | 706 | — | 730 |
| 1.5 | 778 | 822 | 762 | — | 746 | 766 | 798 | 798 |
| 2.0 | 814 | 824 | 822 | 840 | 810 | 822 | 830 | 826 |
| 2.5 | 814 | 840 | 840 | — | 842 | 834 | 832 | 834 |
| 3.0 | 816 | 840 | 842 | 842 | 846 | 840 | — | 842 |
| 3.5 | 816 | 842 | 842 | — | 862 | 840 | — | 844 |
| 4.0 | 818 | 846 | 840 | 844 | 862 | 842 | — | 866 |
| 4.5 | 818 | 864 | 840 | — | 866 | 844 | — | 872 |
| 5.0 | 826 | 872 | 842 | 862 | 862 | 844 | — | 874 |
| 5.5 | 820 | 882 | 842 | — | 868 | 850 | — | 876 |
| 6.0 | 826 | 882 | 842 | 870 | 870 | 862 | — | 882 |
| 7.0 | 828 | 892 | 842 | — | 872 | 872 | — | 886 |
| 8.0 | 834 | 888 | 844 | 876 | 872 | 878 | — | 894 |
| 9.0 | 840 | 890 | 844 | — | 874 | 886 | — | 888 |
| 10.0 | 840 | 898 | 846 | 888 | 876 | 890 | — | 888 |
| 11.0 | 840 | 900 | 848 | — | — | 886 | — | — |
| 12.0 | 840 | 900 | 848 | — | — | 890 | — | 886 |
| 13.0 | 842 | 900 | 862 | — | — | 894 | — | — |
| 14.0 | 842 | 902 | 862 | — | — | 898 | — | — |
| 15.0 | 842 | 900 | 862 | — | — | 898 | — | 892 |

From the figure and the table, it is seen that over a broad range (1 to 15) of OH/Cu, $\lambda$max is of the same order or higher in the Examples (curves L11 to L17) than in the Comparative Example 1 (curve L10). It was found that the shift of this $\lambda$max to longer wavelength is particularly remarkable when OH/Cu is approx. 2 or more.

Figure 3:
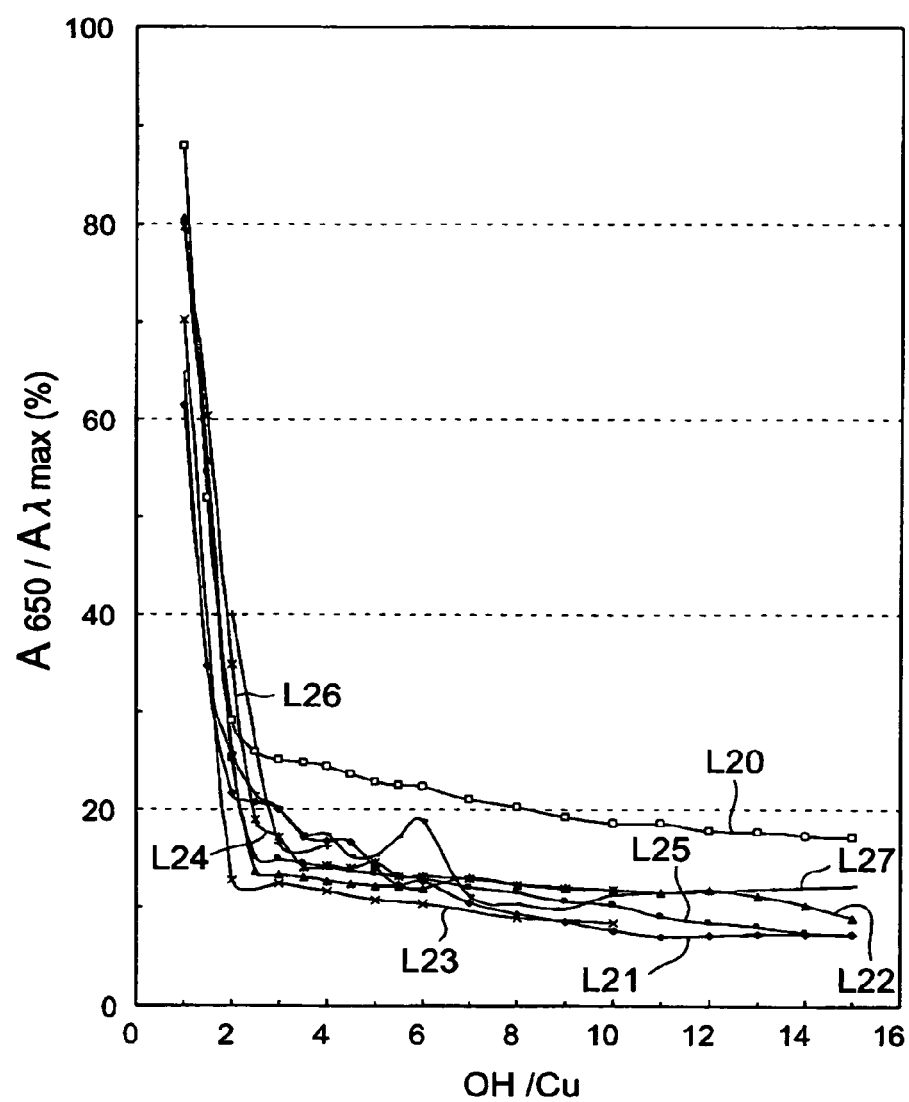
FIG. 3 is a graph showing a variation of $A_{650}/A_{\lambda max}$ in the Examples and Comparative Example with respect to OH/Cu.
Figure 4:
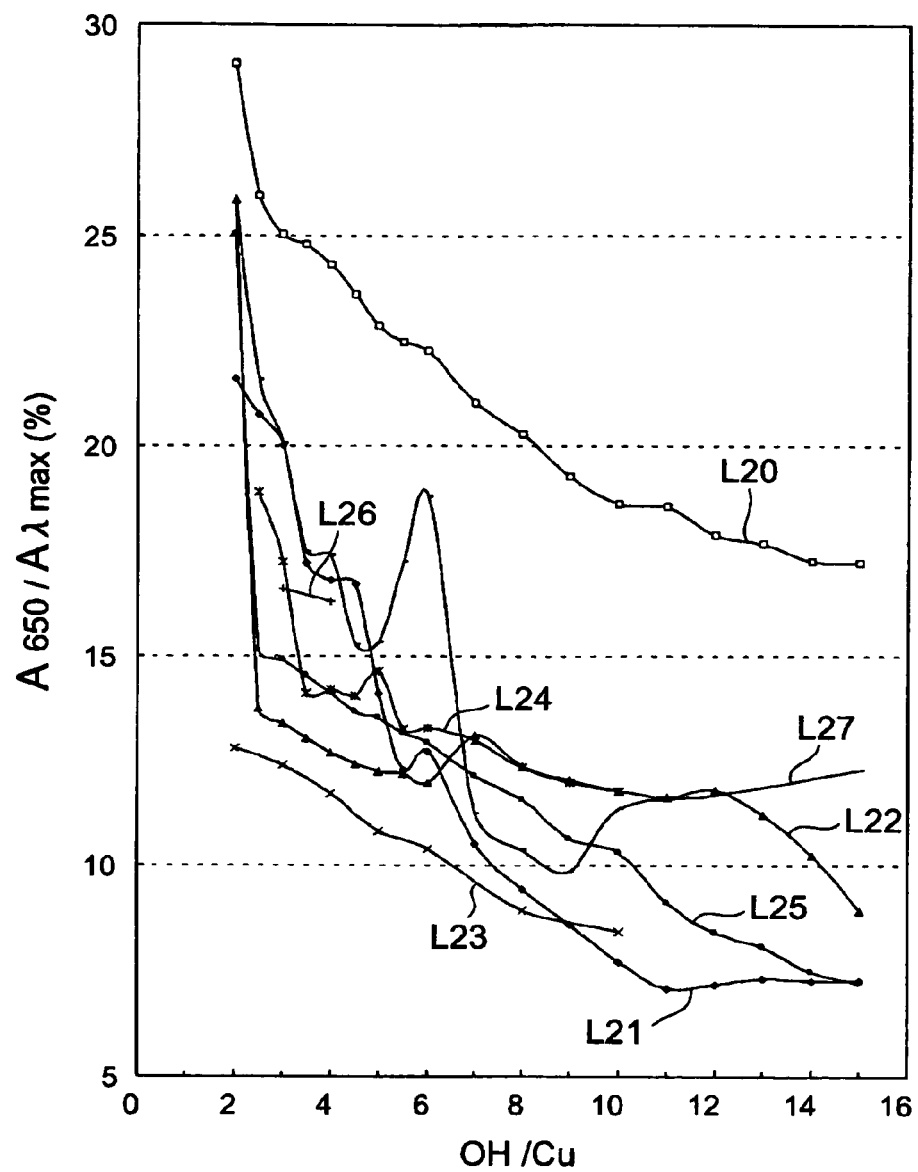
FIG. 4 is a vertical axis enlargement of a part corresponding to OH/Cu=2 to 16 in FIG. 3.

Next, FIG. 3 is a graph showing a variation of the ratio (%) (hereafter, and in the figures and tables, referred to as "$A_{650}/A_{\lambda max}$") of the absorbance at a wavelength of 650 nm, which is the long wavelength part of the visible light transmittance wavelength region (wavelength of approx. 400 to 650 nm shown in FIG. 1) to the absorbance at λmax in the Examples and Comparative Example, with OH/Cu. FIG. 4 is a vertical axis enlargement of the part corresponding to OH/Cu=2 to 16 in FIG. 3. Data for which the value of the ratio exceeds 30% have been omitted. Numerical data is shown in Table 2.

The value of this ratio shows visible light low absorption properties normalized with respect to infrared light absorption properties, and is considered to be one indicator for evaluating the quality of the specific composition having both infrared light absorption properties and visible light low absorption properties. The smaller is the value of this ratio, the better is the light absorption from the near-infrared region to the infrared region, and the lower is the absorption in the visible region in the long wavelength part of the visible light transmittance wavelength region. The curves L20 and L21 to L27 in the figure are curves which smoothly connect the data of Comparative Example 1 and Examples 1 to 7, respectively.

TABLE 2

$A_{650}/A_{\lambda max}$ (%)

| OH/Cu | Comp. Ex. 1 PMOE | Ex. 1 DIPHP | Ex. 2 3ClPHP | Ex. 3 4ClPHP | Ex. 4 2FPHP | Ex. 5 4FPHP | Ex. 6 NAPHP | Ex. 7 2PHPHP |
|---|---|---|---|---|---|---|---|---|
| 1 | 87.98 | 61.52 | 80.66 | 70.22 | 79.78 | 80.18 | — | 64.87 |
| 1.5 | 51.91 | 34.73 | 55.94 | — | 60.34 | 54.58 | 40.03 | 34.34 |
| 2 | 29.08 | 21.61 | 25.86 | 12.78 | 34.93 | 25.03 | 16.58 | 25.82 |
| 2.5 | 25.95 | 20.76 | 13.75 | — | 18.92 | 15.12 | 16.30 | 21.58 |
| 3 | 25.03 | 20.03 | 13.38 | 12.38 | 17.23 | 14.89 | — | 20.07 |
| 3.5 | 24.80 | 17.22 | 13.03 | — | 14.09 | 14.52 | — | 17.50 |
| 4 | 24.31 | 16.81 | 12.68 | 11.68 | 14.19 | 14.08 | — | 17.40 |
| 4.5 | 23.61 | 16.70 | 12.40 | — | 14.03 | 13.66 | — | 15.25 |
| 5 | 22.86 | 14.11 | 12.22 | 10.80 | 14.64 | 13.50 | — | 15.32 |
| 5.5 | 22.47 | 12.27 | 12.16 | — | 13.23 | 13.14 | — | 17.24 |
| 6 | 22.26 | 12.70 | 11.97 | 10.39 | 13.26 | 12.90 | — | 18.81 |
| 7 | 21.02 | 10.49 | 13.08 | — | 12.96 | 12.10 | — | 11.22 |
| 8 | 20.27 | 9.42 | 12.35 | 8.92 | 12.30 | 11.55 | — | 10.34 |
| 9 | 19.27 | 8.59 | 12.03 | — | 11.95 | 10.62 | — | 9.86 |
| 10 | 18.62 | 7.70 | 11.75 | 8.42 | 11.75 | 10.30 | — | 11.34 |
| 11 | 18.56 | 7.09 | 11.60 | — | — | 9.09 | — | — |
| 12 | 17.88 | 7.16 | 11.78 | — | — | 8.40 | — | 11.66 |
| 13 | 17.67 | 7.32 | 11.18 | — | — | 8.06 | — | — |
| 14 | 17.26 | 7.27 | 10.24 | — | — | 7.47 | — | — |
| 15 | 17.23 | 7.27 | 8.92 | — | — | 7.20 | — | 12.24 |

From this result, it is seen that over the whole range of OH/Cu in the figure, $A_{650}/A_{\lambda max}$ for the specific composition of the Examples generally showed a smaller value as compared with the Comparative Example, and that this tendency is particularly marked when OH/Cu is 2 or more.

Figure 5:
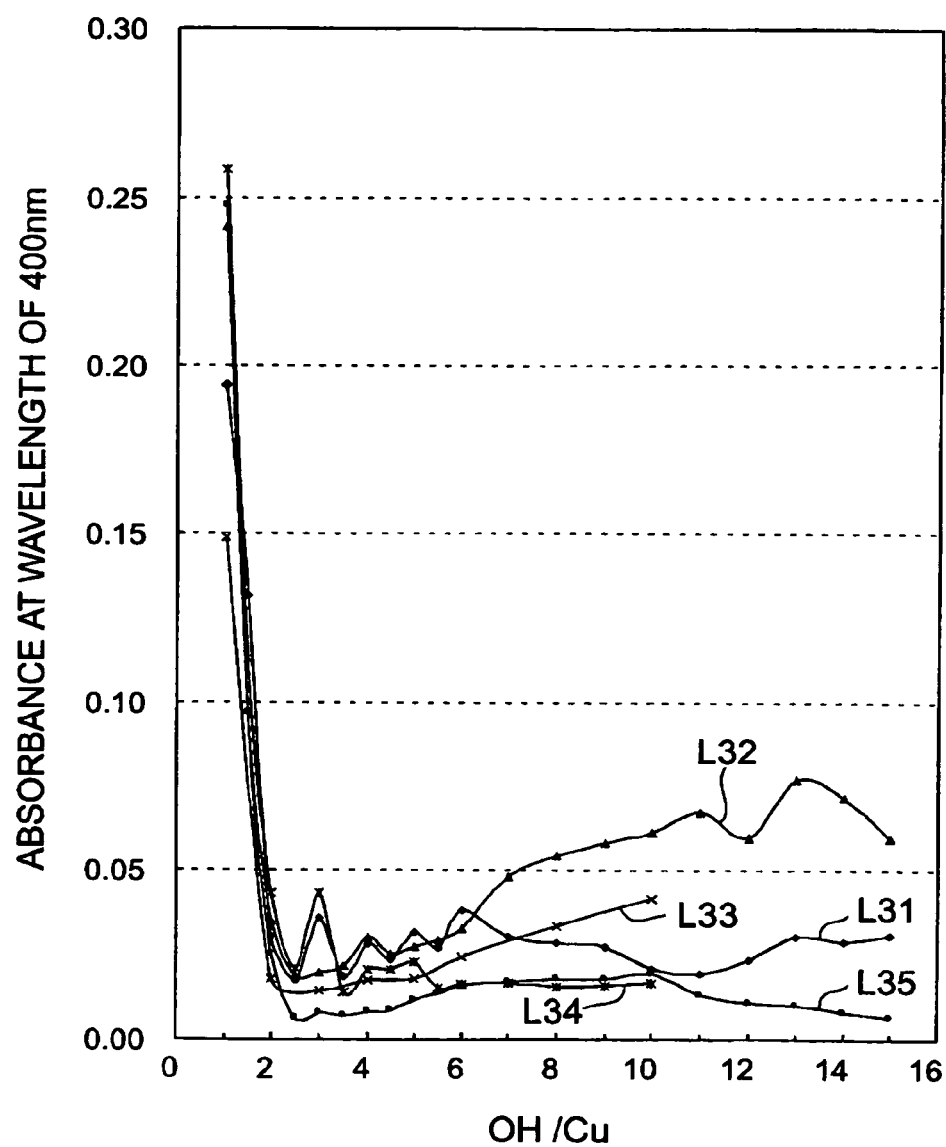
FIG. 5 is a graph showing a variation of absorbance at a wavelength of 400 nm in Examples 1 to 5 with respect to OH/Cu.

Next, FIG. 5 is a graph showing a variation of the absorbance (absolute value) at a wavelength of 400 nm in Examples 1 to 5 with respect to OH/Cu. The curves L31 to L35 in the figure are curves which smoothly connect the data of Examples 1 to 5, respectively. Numerical data is shown in Table 3. The wavelength of 400 nm is the short wavelength part of the visible light transmittance wavelength region described earlier, and the magnitude of the absorbance at this wavelength is considered to be one indicator of the expansion of the visible light transmittance wavelength region to shorter wavelengths.

TABLE 3

Absorbance at wavelength of 400 nm

| OH/Cu | Ex. 1 DIPHP | Ex. 2 3ClPHP | Ex. 3 4ClPHP | Ex. 4 2FPHP | Ex. 5 4FPHP |
|---|---|---|---|---|---|
| 1 | 0.1943 | 0.2415 | 0.1489 | 0.2584 | 0.2478 |
| 1.5 | 0.1316 | 0.0977 | — | 0.1130 | 0.0968 |
| 2 | 0.0302 | 0.0351 | 0.0178 | 0.0430 | 0.0248 |
| 2.5 | 0.0172 | 0.0189 | — | 0.0207 | 0.0062 |
| 3 | 0.0356 | 0.0196 | 0.0144 | 0.0431 | 0.0075 |
| 3.5 | 0.0186 | 0.0215 | — | 0.0137 | 0.0068 |
| 4 | 0.0281 | 0.0299 | 0.0171 | 0.0202 | 0.0081 |
| 4.5 | 0.0234 | 0.0249 | — | 0.0205 | 0.0086 |
| 5 | 0.0314 | 0.0272 | 0.0175 | 0.0227 | 0.0116 |
| 5.5 | 0.0270 | 0.0291 | — | 0.0148 | 0.0134 |
| 6 | 0.0381 | 0.0326 | 0.0243 | 0.0162 | 0.0156 |
| 7 | 0.0304 | 0.0479 | — | 0.0166 | 0.0170 |
| 8 | 0.0286 | 0.0541 | 0.0335 | 0.0152 | 0.0178 |
| 9 | 0.0274 | 0.0579 | — | 0.0159 | 0.0176 |
| 10 | 0.0208 | 0.0612 | 0.0414 | 0.0167 | 0.0192 |
| 11 | 0.0191 | 0.0674 | — | — | 0.0130 |
| 12 | 0.0236 | 0.0596 | — | — | 0.0107 |

TABLE 3-continued

Absorbance at wavelength of 400 nm

| OH/Cu | Ex. 1 DIPHP | Ex. 2 3ClPHP | Ex. 3 4ClPHP | Ex. 4 2FPHP | Ex. 5 4FPHP |
|---|---|---|---|---|---|
| 13 | 0.0304 | 0.0769 | — | — | 0.0100 |
| 14 | 0.0289 | 0.0716 | — | — | 0.0081 |
| 15 | 0.0308 | 0.0597 | — | — | 0.0064 |

From the figure and the table, it is seen that in the region of OH/Cu=2 to 9, the specific compositions of Examples 2 to 5 have an absorbance at a wavelength of 400 nm of the same order as or smaller than that of Comparative Example 1 (however, in Examples 2 and 3, good results were obtained at OH/Cu=2 to 6). The phosphoric ester compound used in Examples 2 to 5 has a halogenated phenyl group, so this result can be said to show the result of halogenation.

Figure 6:
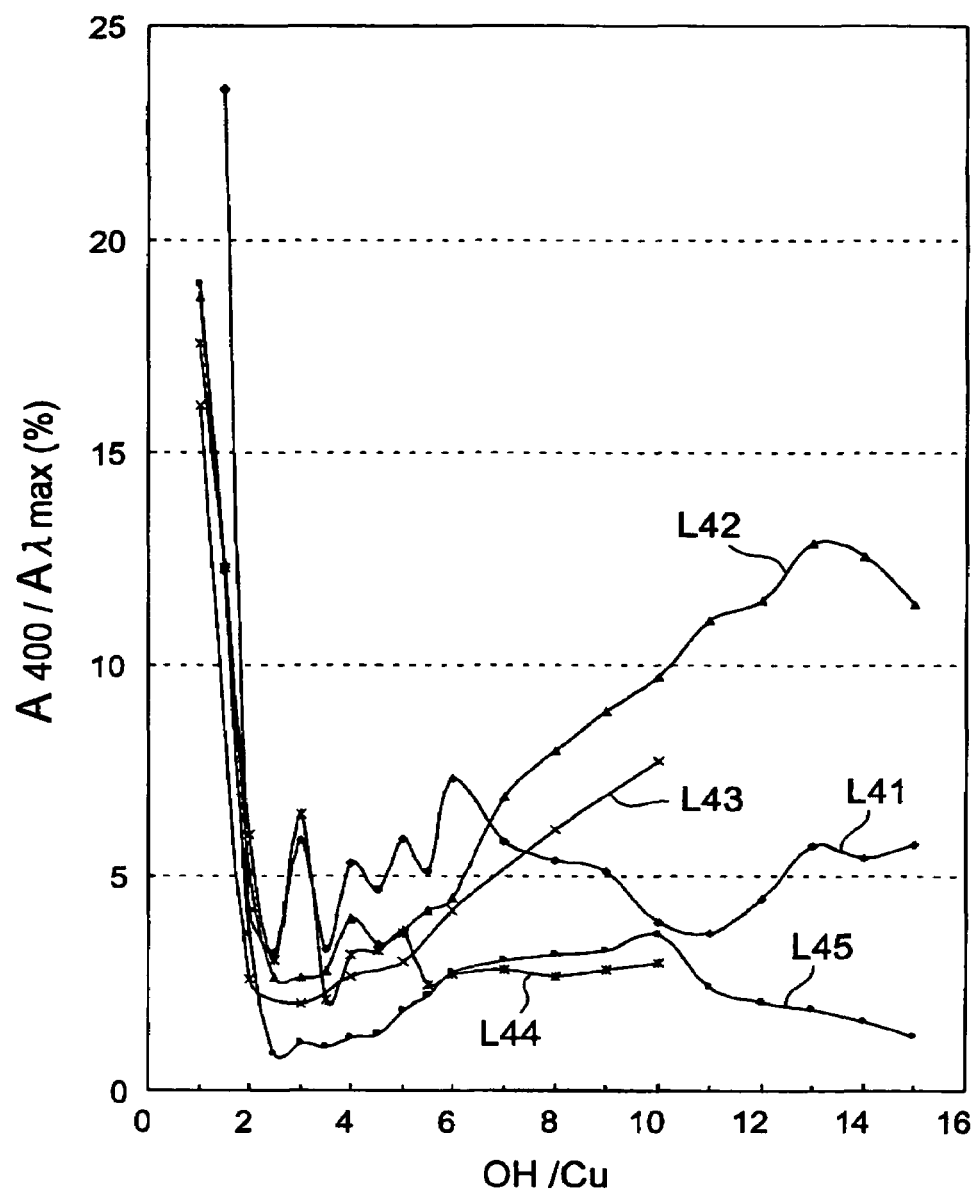
FIG. 6 is a graph showing a variation of $A_{400}/A_{\lambda max}$ in Examples 1 to 5 with respect to OH/Cu.

FIG. 6 is a graph showing the variation of the ratio (%) (hereafter, and in the figures and tables, referred to as "$A_{400}/A_{\lambda max}$") of the absorbance at a wavelength of 400 nm which is the short wavelength part of the visible light transmittance wavelength region (wavelength of approx. 400 to 650 nm shown in FIG. 1) to the absorbance at λmax of Examples 1 to 5, with OH/Cu. Numerical data is shown in Table 4.

TABLE 4

| | $A_{400}/A_{\lambda max}$ (%) | | | | |
|---|---|---|---|---|---|
| OH/Cu | Ex. 1 DIPHP | Ex. 2 3ClPHP | Ex. 3 4ClPHP | Ex. 4 2FPHP | Ex. 5 4FPHP |
| 1 | 28.97 | 18.68 | 16.10 | 17.58 | 18.97 |
| 1.5 | 23.53 | 12.36 | — | 12.27 | 12.17 |
| 2 | 4.22 | 5.13 | 2.60 | 6.00 | 3.64 |
| 2.5 | 3.21 | 2.65 | — | 3.04 | 0.86 |
| 3 | 5.86 | 2.63 | 2.02 | 6.47 | 1.11 |
| 3.5 | 3.29 | 2.80 | — | 2.13 | 1.03 |
| 4 | 5.33 | 4.02 | 2.68 | 3.16 | 1.23 |
| 4.5 | 4.71 | 3.43 | — | 3.26 | 1.35 |
| 5 | 5.91 | 3.75 | 3.02 | 3.69 | 1.87 |
| 5.5 | 5.15 | 4.21 | — | 2.47 | 2.23 |
| 6 | 7.34 | 4.52 | 4.23 | 2.74 | 2.74 |
| 7 | 5.85 | 6.89 | — | 2.84 | 3.06 |
| 8 | 5.40 | 8.00 | 6.11 | 2.66 | 3.19 |
| 9 | 5.15 | 8.90 | — | 2.81 | 3.27 |
| 10 | 3.93 | 9.72 | 7.75 | 3.00 | 3.65 |
| 11 | 3.68 | 11.03 | — | — | 2.42 |
| 12 | 4.48 | 11.51 | — | — | 2.06 |
| 13 | 5.74 | 12.89 | — | — | 1.91 |
| 14 | 5.46 | 12.55 | — | — | 1.61 |
| 15 | 5.77 | 11.42 | — | — | 1.26 |

The value of this ratio shows visible light low absorption properties normalized with respect to infrared light absorption properties, and is considered to be one indicator for evaluating the quality of the specific composition having both infrared light absorption properties and visible light low absorption properties. The smaller is the value of this ratio, the better is the light absorption from the near-infrared region to the infrared region, and the lower is the absorption in the visible region in the short wavelength part of the visible light transmittance wavelength region. The curves L41 to L45 in the figure are curves which smoothly connect the data of Examples 1 to 5, respectively.

As a result, the same tendency as that shown in FIG. 5 is found also for $A_{400}$ in Examples 1 to 5.

Figure 7:
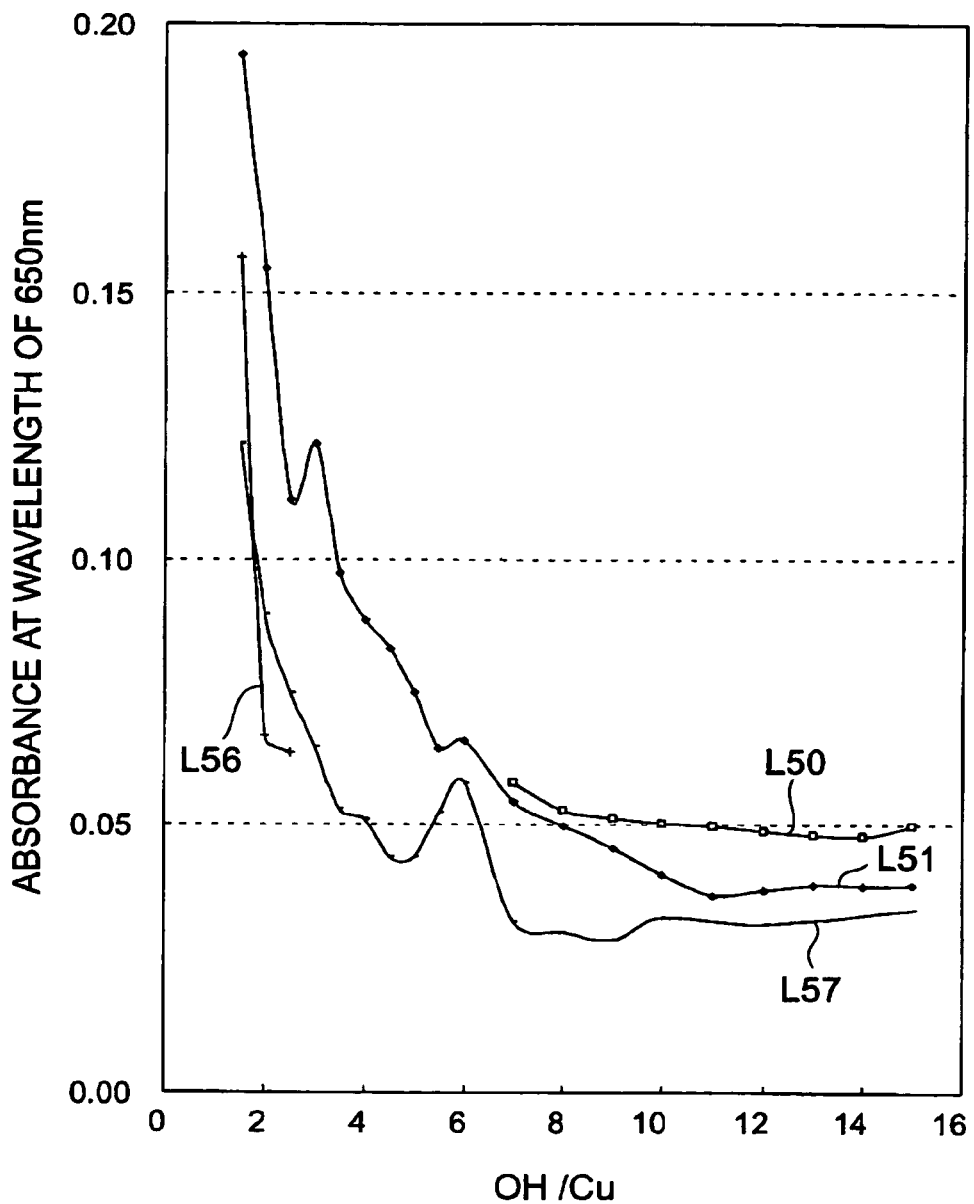
FIG. 7 is a graph showing a variation of absorbance at a wavelength of 650 nm in Comparative Example 1, and Examples 1, 6 and 7, with respect to OH/Cu.

FIG. 7 is a graph showing the variation of the absorbance (absolute value) at a wavelength of 650 nm in Comparative Example 1 and Examples 1, 6 and 7 with OH/Cu. The curves L50, L51, L56 and L57 in the figure are curves which smoothly connect the data of Comparative Example 1 and Examples 1, 6 and 7, respectively. Numerical data is shown in Table 5. The wavelength of 650 nm is the aforesaid long wavelength part of the visible light transmittance wavelength region, and the magnitude of the absorbance at this wavelength is considered to be one indicator showing the expansion of the visible light transmittance wavelength region to longer wavelengths.

TABLE 5

| | Absorbance at wavelength of 650 nm | | | |
|---|---|---|---|---|
| OH/Cu | Comp. Ex. 1 PMOE | Ex. 1 DIPHP | Ex. 6 NAPHP | Ex. 7 2PHPHP |
| 1.5 | — | 0.1943 | 0.1566 | 0.1218 |
| 2 | — | 0.1546 | 0.0669 | 0.0896 |
| 2.5 | — | 0.1113 | 0.0636 | 0.0747 |

TABLE 5-continued

| | Absorbance at wavelength of 650 nm | | | |
|---|---|---|---|---|
| OH/Cu | Comp. Ex. 1 PMOE | Ex. 1 DIPHP | Ex. 6 NAPHP | Ex. 7 2PHPHP |
| 3 | — | 0.1218 | — | 0.0647 |
| 3.5 | — | 0.0973 | — | 0.0531 |
| 4 | — | 0.0886 | — | 0.0511 |
| 4.5 | — | 0.0830 | — | 0.0438 |
| 5 | — | 0.0749 | — | 0.0438 |
| 5.5 | — | 0.0643 | — | 0.0522 |
| 6 | — | 0.0659 | — | 0.0580 |
| 7 | 0.0579 | 0.0545 | — | 0.0319 |
| 8 | 0.0528 | 0.0499 | — | 0.0298 |
| 9 | 0.0512 | 0.0457 | — | 0.0284 |
| 10 | 0.0503 | 0.0407 | — | 0.0326 |
| 11 | 0.0497 | 0.0368 | — | — |
| 12 | 0.0488 | 0.0377 | — | 0.0314 |
| 13 | 0.0481 | 0.0388 | — | — |
| 14 | 0.0479 | 0.0385 | — | — |
| 15 | 0.0498 | 0.0388 | — | 0.0341 |

From the figure and the table, it was found that over the whole range of OH/Cu, the specific composition of Example 7 has a lower absorbance at a wavelength of 650 nm compared with Example 1. The phosphoric ester compound used in Example 7 has a phenyl group substituted by a phenyl group, so this result can be said to be the effect of phenyl group substitution.

In Example 6, it was found that when OH/Cu was 1.5 to 2.5, as compared with Example 1, the absorbance at a wavelength of 650 nm is smaller. If this result and the effect of steric hindrance in the molecular structure are considered together, it can be analogized that, even if a phosphoric ester compound having a naphthyl group as in Example 6, is used, the absorbance at a wavelength of 650 nm can be further reduced over a wide range of OH/Cu. It was also found that, when OH/Cu is 7 or more, the specific compositions of Examples 1, 6 and 7 show a lower absorbance even compared with Comparative Example 1.

Example 8

The phosphoric ester compound (hereafter, "PP2MP") represented by the aforesaid formulae (10)-e and (10)-f described above was synthesized by the following steps. First, 40 g of 4-(2-hydroxyethyl)phenol (Compound 1) represented by the following formula (12) and 64.46 g triethylamine were added to a vessel containing 300 ml methylene chloride, and stirred for 10 minutes at room temperature.

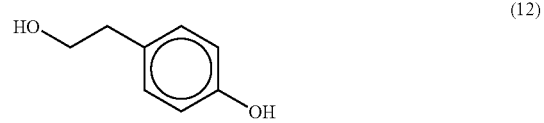

(12)

After cooling this solution to 0° C. and dripping in methacryloyl chloride (90 g) over 30 minutes using a dropping funnel, it was allowed to stand for 1 hour, and Compound 1 represented by the above formula (12) reacted with the methacryloyl chloride to obtain a compound (Compound 2) represented by the following formula (13):

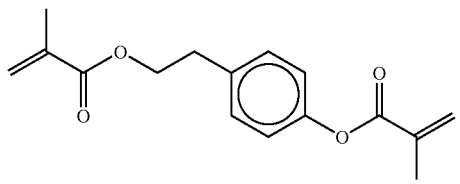

(13)

Next, the solution was filtered and ethyl acetate was added to the filtrate. The filtrate was subjected to filtration under reduced pressure to remove only methylene chloride. Water was then added to this filtrate, and the compound represented by formula (13) was extracted with ethyl acetate. The extract was washed with 1% hydrochloric acid and saturated sodium chloride solution, and anhydrous sodium sulfate was added to remove water. The solution was concentrated under reduced pressure, and the concentrated solution was purified by column chromatography using a carrier solution prepared from ethyl acetate and n-hexane in a volume ratio of 1:3 to obtain Compound 2. The purified Compound 2 weighed 78.8 g and the yield was 92.2%.

Next, Compound 2 (20.17 g) was added to 80 ml of water and 320 ml of methanol, stirred at room temperature for 20 minutes, sodium hydrogen carbonate was added, and the solution stirred at room temperature for 10 minutes. This solution was then heated to 70° C., and Compound 2 was reacted with sodium hydrogen carbonate over 9 hours to obtain a Compound 3 represented by the following formula (14):

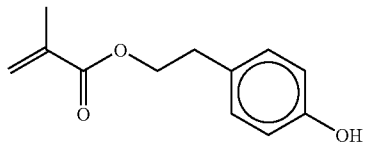

(14)

This solution was cooled, 1% hydrochloric acid was added, and Compound 3 was extracted with ethyl acetate. The organic layer was washed with saturated sodium chloride, and anhydrous sodium sulfate was added. Next, the organic layer was concentrated under reduced pressure, and the concentrated solution was purified by column chromatography using a carrier solution prepared from ethyl acetate and n-hexane in volume ratio of 1:3 to obtain a white powder. The obtained white powder was washed with petroleum ether, and filtered. This white powder was dried under reduced pressure to obtain Compound 3. The purified Compound 3 weighed 11.61 g and the yield was 76.6%.

Next, Compound 3 (45.39 g) was added to 17.42 g of pyridine and 90 ml of toluene, and this solution was stirred and dissolved at room temperature. On the other hand, 16.88 g of phosphorus oxychloride and 45 ml of toluene were mixed, and stirred at room temperature for 10 minutes. The solution containing Compound 3 which had been prepared previously was dripped in over 1 hour using a dropping funnel, and the mixed solution was refluxed for 6.5 hours.

After cooling this mixed solution, 900 ml of water was added. Next, this was heated at 85° C. for 5 hours so that Compound 3 reacted with phosphorus oxychloride, and 39.91 g of the phosphoric ester compound (hereafter, "PP2MP") represented by formulae (10)-e and (10)-f was obtained.

Next, 0.8 g of copper benzoate and a predetermined amount of PP2MP obtained as described above were stirred in MEK for 2 hours, and a liquid specific composition was thus obtained. The predetermined amount of PP2MP was varied so that OH/Cu was 2, 3, 4 and 5. As an example, the addition amount of PP2MP when OH/Cu is 2, was 2.48 g.

<Spectral Transmittance Measurement 2>

For the specific composition prepared in Example 8, a spectral absorption measurement was performed in the same way as the aforesaid <Spectral transmittance measurement 1>. As a result, it was found that the composition had a low absorption region (visible light transmittance wavelength region) from a wavelength of approx. 400 to approx. 650 nm, and infrared light absorption properties. It was also found that the peak wavelength λmax of absorbance lies within a wavelength range of about 800 to 900 nm.

Example 9

(1) Monomer Preparation:

A predetermined amount of PP2MP prepared in Example 8 was dissolved in 6.6 g of methyl methacrylate (MMA), 0.5 g of alpha-methyl styrene was added, 0.8 g of copper benzoate was added, and the solution was stirred at room temperature for 48 hours to obtain a monomer solution as a specific composition. The solubility of copper benzoate at room temperature was sufficient. The predetermined amount of PP2MP was varied so that OH/Cu was 2, 3, 4 and 5. Next, when this monomer solution was refrigerated for a predetermined time in a freezer to remove benzoic acid, no precipitate was found after storage.

(2) Assembly of Polymerizing Glass Mold:

Two glass mold plates having a diameter of 81 mm were prepared. An annular packing made from plasticized polyvinyl chloride was disposed on the edge of one glass mold plate, the other glass mold plate was placed over it, and both glass mold plates were pressed and supported by a clamp from outside so as to form a glass mold for polymerization.

(3) Resin Plate Forming:

0.5 g of t-butylperoxydecanoate was respectively added to the monomer solutions having different OH/Cu prepared above in (1), and after passing through a membrane filter, the filtrates were introduced into the polymerizing glass mold assembled above in (2). Next, these were placed in an oven, and polymer solidification was performed by maintaining a constant temperature of 40° C. for 3 hours, raising the temperature from 40° C. to 100° C. over 2 hours, maintaining a constant temperature of 100° C. for 2 hours, and decreasing the temperature from 100° C. to 70° C. over 2 hours. After polymerization was complete, the polymerizing glass mold was removed from the oven, the clamp and glass mold plates were removed, and blue transparent resin plates of thickness 2 mm were thus obtained as the building material of this invention. The ingredients thereof are shown in Table 6.

Comparative Example 2

A monomer solution was prepared and a resin plate was formed as in Example 9, except that PMOE used in Comparative Example 1 was used instead of PP2MP. The ingredients used are collectively shown in Table 6. In preparing the monomer solution, although the solubility of copper benzoate at room temperature was generally good, some of the solution was stirred using an oil bath to promote further dissolution. After storing in a freezer for removing benzoic acid, a precipitate separated. This precipitate was removed by filtration.

TABLE 6

| Ingredient | Ex. 9 | | | | Comp. Ex. 2 | | | |
|---|---|---|---|---|---|---|---|---|
| OH/Cu | 2 | 3 | 4 | 5 | 2 | 3 | 4 | 5 |
| Phosphoric ester compound | PP2MP | | | | PMOE | | | |
| Phosphoric ester compound (g) | 2.48 | 3.72 | 4.96 | 6.2 | 0.95 | 1.42 | 1.9 | 2.38 |
| Copper benzoate (g) | 0.8 | 0.8 | 0.8 | 0.8 | 0.8 | 0.8 | 0.8 | 0.8 |
| MMA (g) | 6.6 | 6.6 | 6.6 | 6.6 | 6.6 | 6.6 | 6.6 | 6.6 |
| λmax (before methanol immersion) (nm) | 766 | 810 | 824 | 840 | 810 | 822 | 828 | 842 |
| λmax (after methanol immersion) (nm) | 788 | 844 | 842 | 844 | 820 | 832 | 840 | 842 |
| λT50% (before methanol immersion) (nm) | 560 | 602 | 614 | 622 | 608 | 632 | 644 | 656 |
| λT50% (after methanol immersion) (nm) | 586 | 664 | 664 | 670 | 618 | 642 | 654 | 662 |

<Spectral Transmittance Measurement 3>

For each resin plate obtained in Example 9 and Comparative Example 2, a spectral transmittance measurement and spectral absorption measurement were carried out using a "U-4000" Spectrophotometer (manufactured by Hitachi, Ltd.). As a result, it was found that the plates had a low absorption region (visible light transmittance wavelength region) from a wavelength of approx. 400 to approx. 650 nm, and infrared light absorption properties. The peak wavelength or absorbance (reverse peak wavelength of transmittance) λmax, and λT50% for near-infrared light where the transmittance was 50%, are respectively shown in Table 6.

Next, these resin plates were immersed in methanol for 5 days, and dried. A spectral transmittance measurement and spectral absorption measurement were performed for each resin plate as described above. As a result, it was found that for the resin plates obtained in Example 9, λmax and λT50% were shifted to the long wavelength side, and for the resin plate having OH/Cu=3 to 5, these wavelengths were higher than those of resin plates having the same OH/Cu obtained in Comparative Example 2.

From this, it was clear that, when the resin plate of Example 9 was immersed in a methanol solution, the low absorption region (transmittance wavelength region) for visible light was expanded. Although the details of this mechanism are not yet fully understood, it can be presumed that components such as benzoic acid present to a small extent in the resin plate are effectively removed from the resin plate by immersion in methanol. However, this is not necessarily the only possible mechanism.

Example 10

A liquid specific composition was obtained in an identical manner to that of Example 6, except that the phosphoric ester compound represented by formula (10)-d was used alone, and OH/Cu was arranged to be 3.0.

<Spectral Transmittance Measurement 4>

Figure 8:
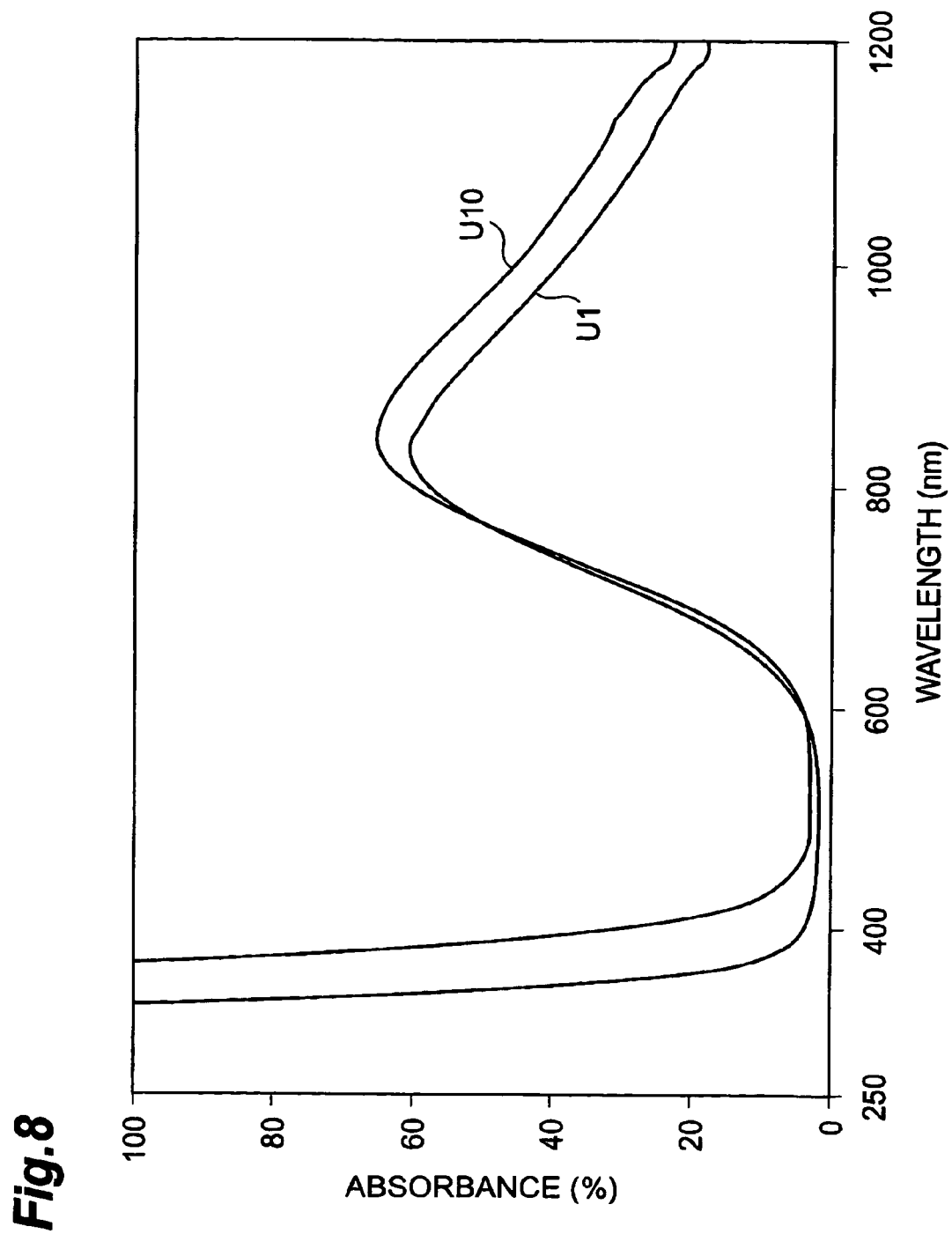
FIG. 8 is a graph showing optical absorption spectra of the specific compositions of Examples 1 and 10 when OH/Cu is 3.

A spectral absorption measurement was performed on the specific composition prepared in Example 10 using a "U-4000" Spectrophotometer (manufactured by Hitachi, Ltd.). FIG. 8 shows the result of this measurement together with the result of a spectral absorption measurement for the specific composition of Example 1 having OH/Cu=3.0. In the figure, curves U1 and U10 are respectively spectral absorption curves for the compositions of Example 1 and Example 10. It can be appreciated that the specific composition contained in the building material of this invention shows excellent ultraviolet light absorption properties. On the other hand, as for the spectral properties (refer to curve L0) for the composition of Comparative Example 1 shown in FIG. 1, the absorbance at a wavelength of 400 nm or less is small as for the visible region. It is also clear that for the composition (curve U10) of Example 10, the absorption at a wavelength in the vicinity of 400 nm was improved relative to the composition (curve U1) of Example 1.

As described above, the building material of this invention has a specific composition containing a specific phosphoric ester compound and copper ion, so in addition to excellent infrared light absorption properties, excellent ultraviolet light absorption properties are obtained. Also, as absorption in the visible region can be reduced as compared with the prior art, greater usefulness than that of the prior art is obtained not only with respect to infrared light absorption properties and ultraviolet light absorption properties, but also with respect to lower absorption in the visible region.

What is claimed is:

1. A building material comprising a phosphoric ester compound represented by the following formula (1):

(wherein, R is a group represented by the following formula (2) or (3):

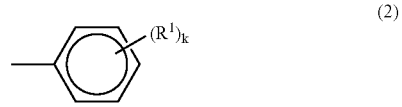

-continued

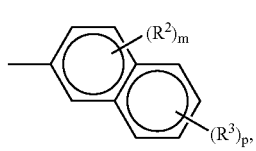
(3)

n is 1 or 2, and when n is 1, R may be identical or different, wherein, $R^1$, $R^2$ and $R^3$ are each independently a halogen atom or a substituent group having 1 to 40 carbon atoms, this substituent group may or may not contain unsaturated bonds, k is an integer of 1 to 5, m is an integer of 1 to 3, and p is an integer of 1 to 4, and when k, m or p is 2 or more, $R^1$, $R^2$ and $R^3$ may be mutually identical or different), and a copper ion.

2. The building material according to claim 1, wherein the content of hydroxyl groups or oxygen atoms derived from said hydroxyl groups in said phosphoric ester compound to one mole of said copper ion, is 2 moles or more.

3. The building material according to claim 1 or 2, wherein said phosphoric ester compound is such that $R^1$ in said formula (2) and $R^2$ and $R^3$ in said formula (3) may be each independently:
a halogen atom;
a substituted or unsubstituted alkyl group having 1 to 10 carbon atoms;
a group having 2 to 20 carbon atoms containing at least one unsaturated bond;
an unsubstituted phenyl group; or
a phenyl group wherein at least one hydrogen atom is substituted by a halogen atom, an alkyl group having 1 to 10 carbon atoms, or a group having 2 to 20 carbon atoms containing at least one unsaturated bond.

4. The building material according to claim 1 or 2, wherein said phosphoric ester compound is such that R in said formula (1) is represented by the following formula (2)-a:

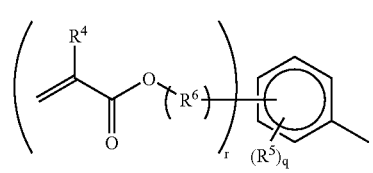
(2)-a (wherein, $R^4$ is a hydrogen atom or a methyl group, $R^5$ is a hydrogen atom, an alkyl group having 1 to 10 carbon atoms, a halogen atom, an alkoxy group or a phenyl group, $R^6$ is a straight-chain, branched or cyclic alkylene group having 1 to 10 carbon atoms, q is an integer of 0 to 4, r is an integer of 1 to 5, and q+r is an integer of 1 to 5).

* * * * *